(12) United States Patent
Alshin et al.

(10) Patent No.: US 10,645,414 B2
(45) Date of Patent: May 5, 2020

(54) METHOD FOR ENCODING/DECODING IMAGE, AND DEVICE THEREFOR

(71) Applicant: SAMSUNG ELECTRONICS CO., LTD., Suwon-si (KR)

(72) Inventors: Alexander Alshin, Suwon-si (KR); Mikhail Mishurovskiy, Moscow (RU)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 42 days.

(21) Appl. No.: 15/775,627

(22) PCT Filed: Nov. 10, 2016

(86) PCT No.: PCT/KR2016/012885
§ 371 (c)(1),
(2) Date: May 11, 2018

(87) PCT Pub. No.: WO2017/082636
PCT Pub. Date: May 18, 2017

(65) Prior Publication Data
US 2018/0324456 A1   Nov. 8, 2018

Related U.S. Application Data

(60) Provisional application No. 62/253,815, filed on Nov. 11, 2015.

(51) Int. Cl.
*H04N 19/573*   (2014.01)
*H04N 19/52*    (2014.01)
(Continued)

(52) U.S. Cl.
CPC ......... *H04N 19/573* (2014.11); *H04N 19/105* (2014.11); *H04N 19/109* (2014.11);
(Continued)

(58) Field of Classification Search
CPC .. H04N 19/573; H04N 19/105; H04N 19/109; H04N 19/172; H04N 19/176;
(Continued)

(56) References Cited

U.S. PATENT DOCUMENTS

| | | | |
|---|---|---|---|
| 7,512,182 B2 | 3/2009 | Chen | |
| 8,369,417 B2 | 2/2013 | Au et al. | |

(Continued)

FOREIGN PATENT DOCUMENTS

| | | | |
|---|---|---|---|
| KR | 10-2008-0064007 A | 7/2008 | |
| KR | 10-2014-0123980 A | 10/2014 | |

(Continued)

OTHER PUBLICATIONS

Esche, et al., "Adaptive Temporal Trajectory Filtering for Video Compression", May 2012, IEEE Transactions on Circuits and Systems for Video Technology, vol. 22, Issue No. 5, pp. 659-670.

(Continued)

*Primary Examiner* — Hee-Yong Kim
(74) *Attorney, Agent, or Firm* — Sughrue Mion, PLLC

(57) ABSTRACT

Provided is an image decoding method including: determining at least one prediction block included in a current picture from among pictures forming an image; determining a first motion vector related to a current prediction block from among the at least one prediction block; determining a first reference block included in a first reference picture, based on the first motion vector; determining a second reference block included in a second reference picture, based on a location of the first reference block; and decoding the current picture by performing inter prediction on the current prediction block by using at least one of the first reference block and the second reference block, wherein the second reference picture includes a prediction value of the first reference picture. Also, provided are an image decoding apparatus (Continued)

performing the image decoding method, and an image encoding method and apparatus corresponding to the image decoding method and apparatus.

12 Claims, 24 Drawing Sheets

(51) Int. Cl.
| | | |
|---|---|---|
| *H04N 19/577* | (2014.01) | |
| *H04N 19/513* | (2014.01) | |
| *H04N 19/105* | (2014.01) | |
| *H04N 19/109* | (2014.01) | |
| *H04N 19/172* | (2014.01) | |
| *H04N 19/44* | (2014.01) | |
| *H04N 19/176* | (2014.01) | |

(52) U.S. Cl.
CPC ......... *H04N 19/172* (2014.11); *H04N 19/176* (2014.11); *H04N 19/44* (2014.11); *H04N 19/513* (2014.11); *H04N 19/52* (2014.11); *H04N 19/521* (2014.11); *H04N 19/577* (2014.11)

(58) Field of Classification Search
CPC ...... H04N 19/44; H04N 19/513; H04N 19/52; H04N 19/521; H04N 19/577
USPC .................................................... 375/240.15
See application file for complete search history.

(56) References Cited

U.S. PATENT DOCUMENTS

| | | |
|---|---|---|
| 9,313,517 B2 | 4/2016 | Kim |
| 2008/0117977 A1 | 5/2008 | Lee et al. |
| 2012/0106645 A1 | 5/2012 | Lin et al. |
| 2013/0208792 A1 | 8/2013 | He et al. |
| 2013/0329787 A1* | 12/2013 | Ramasubramonian ...................... H04N 19/70 375/240.12 |
| 2015/0023436 A1 | 1/2015 | Nagori et al. |

FOREIGN PATENT DOCUMENTS

| | | |
|---|---|---|
| KR | 10-2015-0000073 A | 1/2015 |
| KR | 10-2015-0060619 A | 6/2015 |
| WO | 2016/200100 A1 | 12/2016 |

OTHER PUBLICATIONS

Search Report dated Feb. 24, 2017, issued by the International Searching Authority in counterpart International Patent Application No. PCT/KR2016/012885 (PCT/ISA/210).

Written Opinion dated Feb. 24, 2017, issued by the International Searching Authority in counterpart International Patent Application No. PCT/KR2016/012885 (PCT/ISA/237).

* cited by examiner

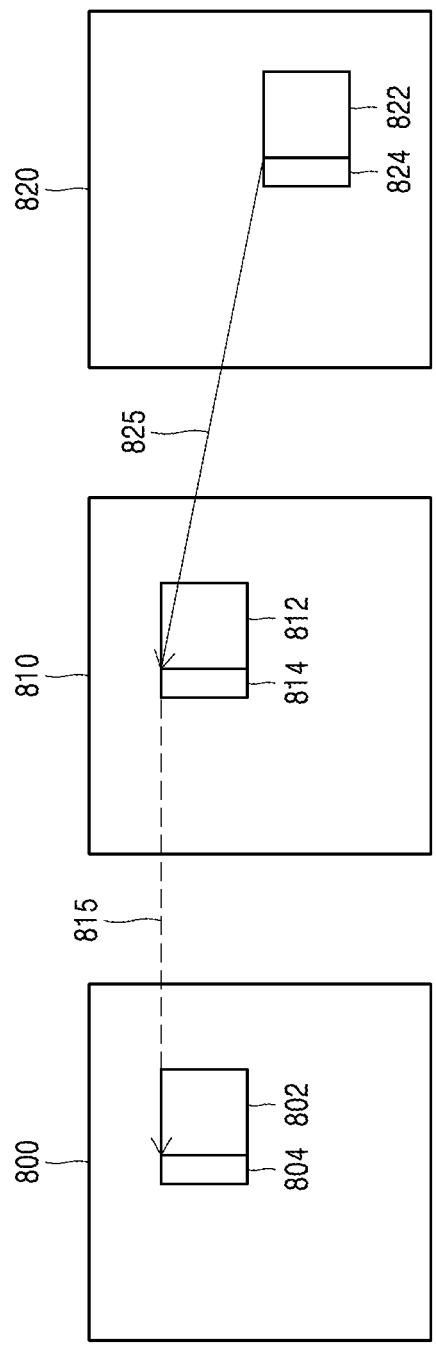

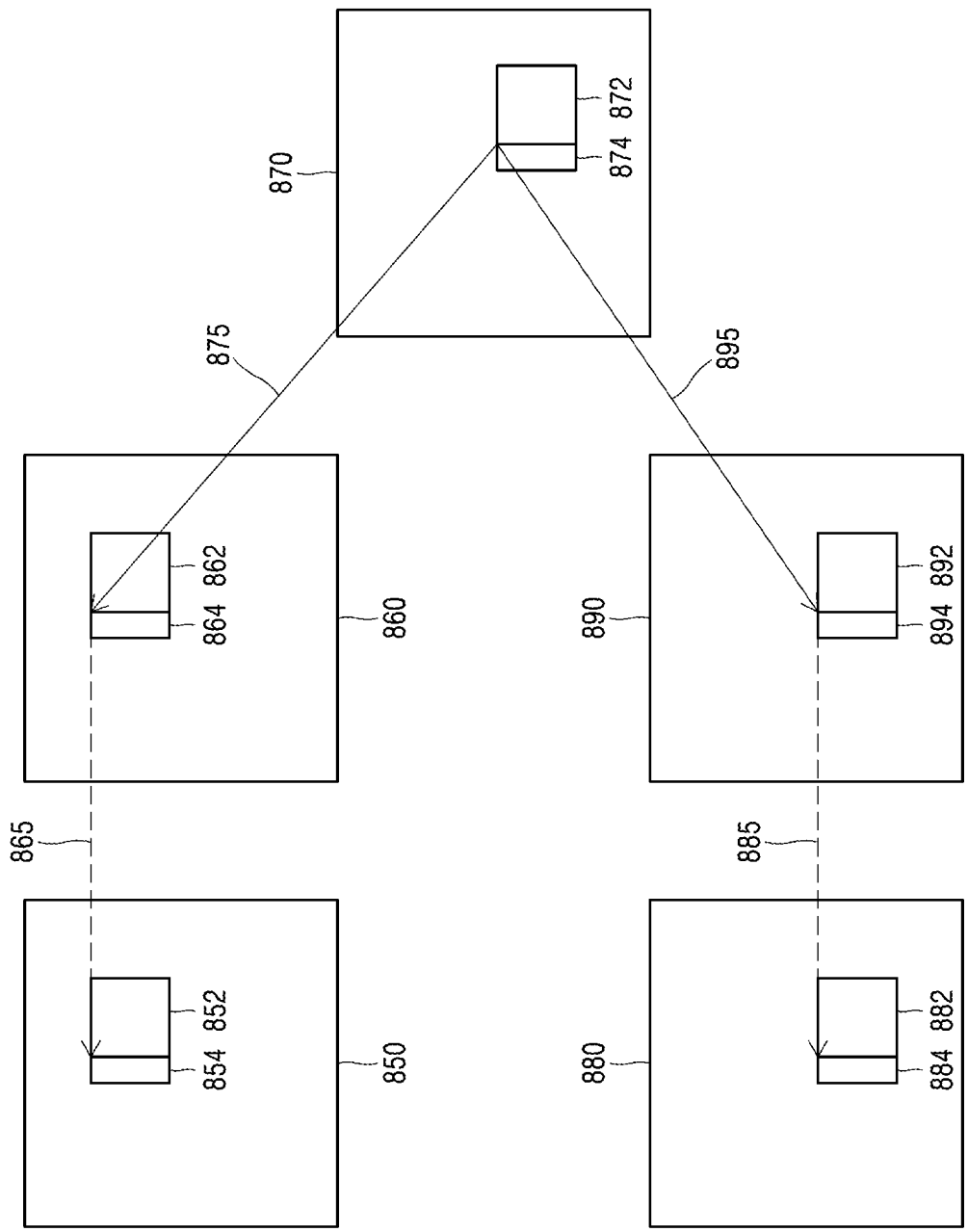

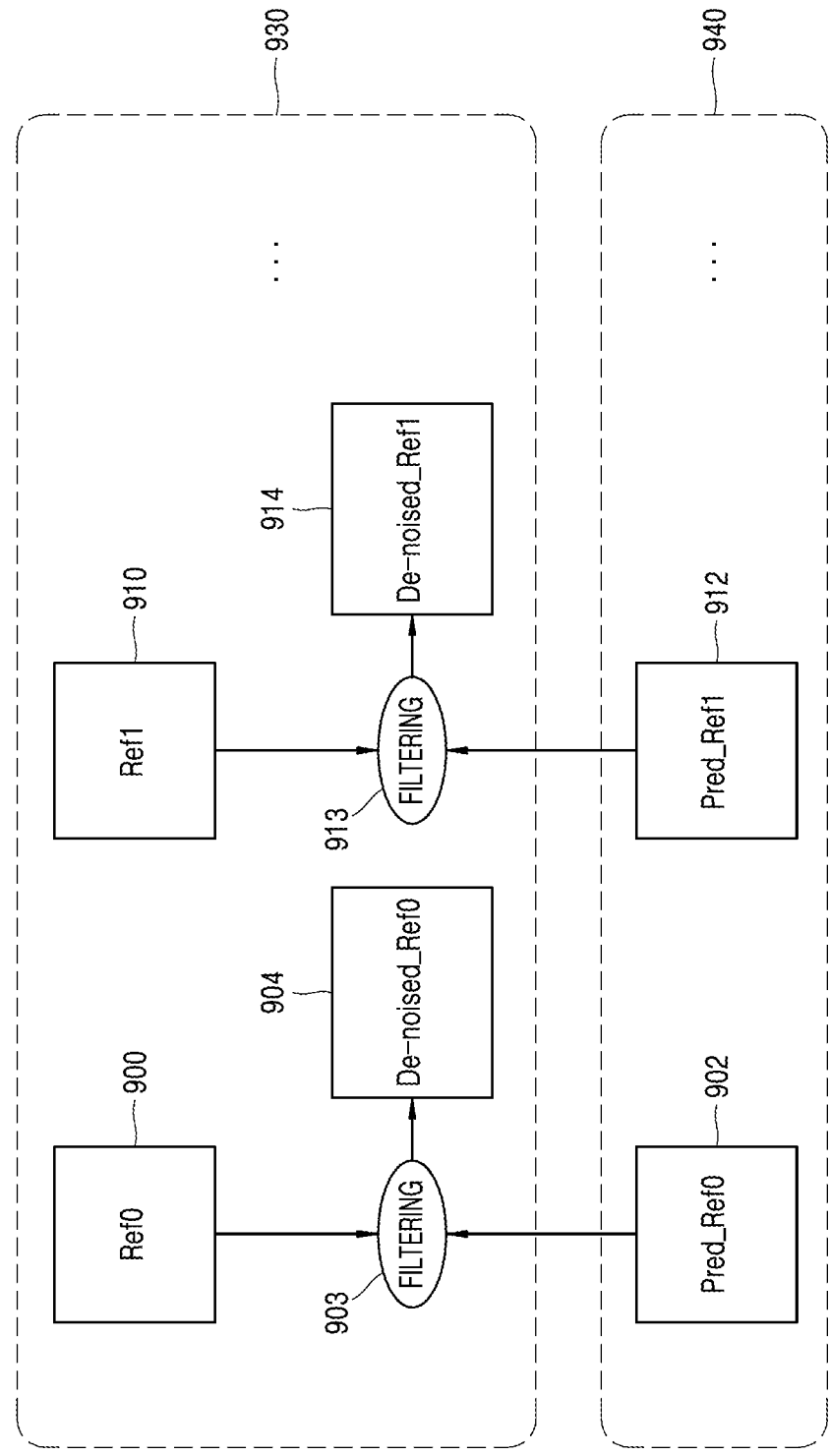

FIG. 11
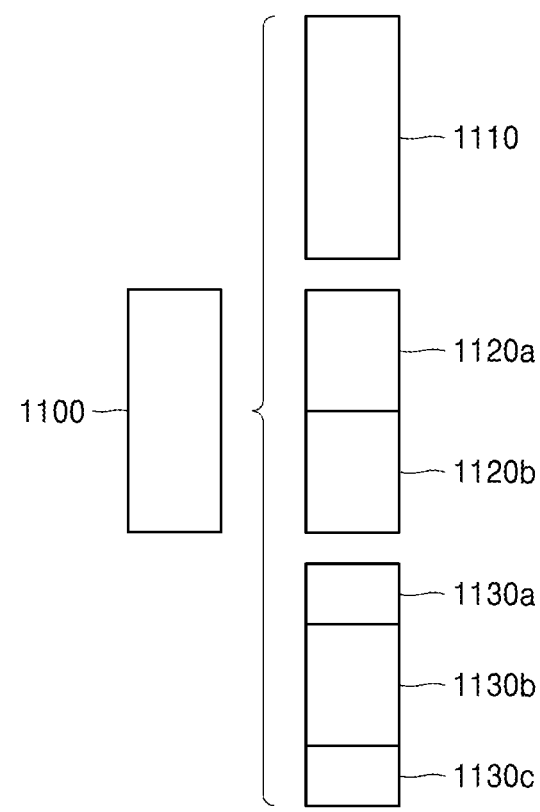
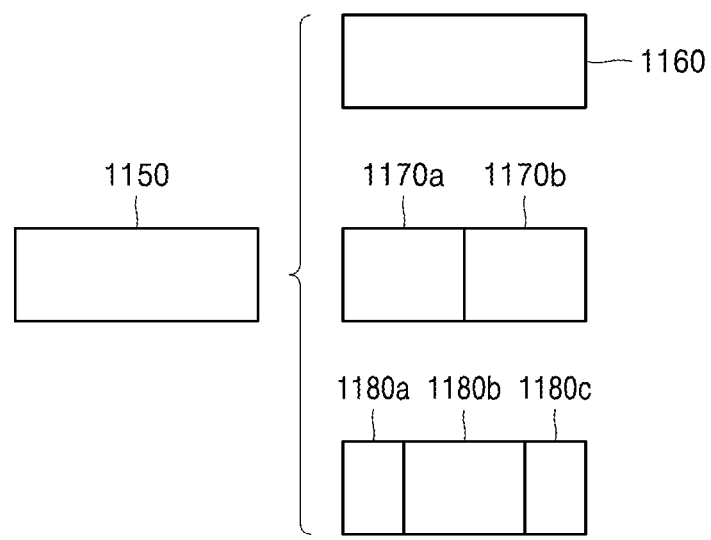

FIG. 20

| BLOCK SHAPE<br>DEPTH | 0: SQUARE | 1: NS_VER | 2: NS_HOR |
|---|---|---|---|
| DEPTH D | 2000 ▢ | 2010 ▯ | 2020 ▭ |
| DEPTH D+1 | 2002 ▢ | 2012 ▯ | 2022 ▭ |
| DEPTH D+2 | 2004 ▢ | 2014 ▯ | 2024 ▭ |
| ... | ... | ... | ... |

METHOD FOR ENCODING/DECODING IMAGE, AND DEVICE THEREFOR

TECHNICAL FIELD

The present disclosure relates to a method and apparatus for encoding or decoding an image by using various data units included in the image.

BACKGROUND ART

Image data is encoded by a codec according to a certain data compression standard, for example, Moving Picture Expert Group (MPEG) standard, and then stored in a recording medium or transmitted through a communication channel in the form of a bitstream.

A standard related to the codec provides a method of efficiently compressing an amount of information of an original image, and during a compression process, a prediction process of determining a sample value to be currently decoded by using already decoded image data is performed. Such a prediction process may include an intra prediction process where spatial prediction is performed and an inter prediction process where temporal prediction is performed. A prediction signal generated according to a result of performing prediction may be added to a residual signal such that image data is reconstructed, and such a residual signal may be obtained by inversely transforming and inversely quantizing information that is transformed and quantized.

DESCRIPTION OF EMBODIMENTS

Technical Problem

When general inter prediction is used, uni-directional prediction in which one reference picture indicated by one motion vector of a current prediction block is used or bi-directional prediction in which two reference pictures indicated by two motion vectors are used may be performed. However, performance of inter prediction needs to be enhanced by improving image quality deterioration caused by noise included in a residual signal used during the inter prediction to reconstruct an image.

Solution to Problem

According to an aspect of the present disclosure, an image decoding method includes: determining at least one prediction block included in a current picture from among pictures forming an image; determining a first motion vector related to a current prediction block from among the at least one prediction block; determining a first reference block included in a first reference picture, based on the first motion vector; determining a second reference block included in a second reference picture, based on a location of the first reference block; and decoding the current picture by performing inter prediction on the current prediction block by using at least one of the first reference block and the second reference block, wherein the second reference picture includes a prediction value of the first reference picture.

According to an aspect of the present disclosure, an image encoding method includes: determining at least one prediction block included in a current picture from among pictures forming an image; determining a first motion vector related to a current prediction block from among the at least one prediction block; determining a first reference block included in a first reference picture, based on the first motion vector; determining a second reference block included in a second reference picture, based on a location of the first reference block; and encoding the current picture by performing inter prediction on the current prediction block by using at least one of the first reference block and the second reference block, wherein the second reference picture includes a prediction value of the first reference picture.

According to an aspect of the present disclosure, an image decoding apparatus includes: a decoder configured to determine at least one prediction block included in a current picture from among pictures forming an image, and determine a first motion vector related to a current prediction block from among the at least one prediction block; and a reference block determiner configured to determine a first reference block included in a first reference picture, based on the first motion vector, and determine a second reference block included in a second reference picture, based on a location of the first reference block, wherein the decoder is further configured to decode the current picture by performing inter prediction on the current prediction block by using at least one of the first reference block and the second reference block, and the second reference picture includes a prediction value of the first reference picture.

According to an aspect of the present disclosure, an image encoding apparatus includes: an encoder configured to determine at least one prediction block included in a current picture from among pictures forming an image, and determine a first motion vector related to a current prediction block from among the at least one prediction block; and a reference block determiner configured to determine a first reference block included in a first reference picture, based on the first motion vector, and determine a second reference block included in a second reference picture, based on a location of the first reference block, wherein the encoder is further configured to encode the current picture by performing inter prediction on the current prediction block by using at least one of the first reference block and the second reference block, and the second reference picture includes a prediction value of the first reference picture.

Advantageous Effects of Disclosure

According to an embodiment, a reference picture used for inter prediction may be variously determined, and accordingly, noise included in a residual signal may be reduced and performance of the inter prediction may be improved by reducing the errors compared with an original signal according to the inter prediction of a block unit.

BRIEF DESCRIPTION OF DRAWINGS

FIG. 8A is a diagram for describing processes of determining at least one of a first reference block and a second reference block as at least one reference block used to perform inter prediction of a current prediction block, according to an embodiment.

FIG. 8B illustrates bi-directional prediction being performed for inter prediction of a current prediction block, according to an embodiment.

FIG. 9 illustrates a method of generating a noise reduced reference picture by using a first reference picture and a second reference picture, according to an embodiment.

FIG. 11 illustrates processes of determining at least one coding unit when a coding unit having a non-square shape is partitioned, according to an embodiment.

FIG. 20 illustrates processes of determining a depth of a coding unit as a shape and size of the coding unit are changed, when a plurality of coding units are determined when the coding unit is recursively partitioned, according to an embodiment.

BEST MODE

Figure 1A:
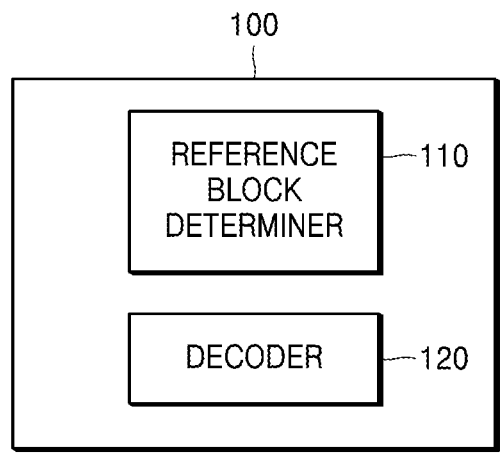
FIG. 1A is a block diagram of an image decoding apparatus capable of performing inter prediction on a current prediction block by using at least one of a first reference block and a second reference block by determining the first reference block and the second reference block, according to an embodiment.

According to an aspect of the present disclosure, an image decoding method includes: determining at least one prediction block included in a current picture from among pictures forming an image; determining a first motion vector related to a current prediction block from among the at least one prediction block; determining a first reference block included in a first reference picture, based on the first motion vector; determining a second reference block included in a second reference picture, based on a location of the first reference block; and decoding the current picture by performing inter prediction on the current prediction block by using at least one of the first reference block and the second reference block, wherein the second reference picture includes a prediction value of the first reference picture.

The second reference picture may include a sample obtained by performing motion estimation and motion compensation during an encoding process of the first reference picture.

The decoding of the current picture may include: determining at least one reference block used to perform the inter prediction, based on reference block information obtained from a bitstream; and performing the inter prediction by using the at least one reference block used to perform the inter prediction, wherein the reference block information may indicate which one of the first and second reference blocks is used to perform the inter prediction on the current prediction block.

The determining of the at least one reference block may include, when the reference block information indicates that the inter prediction is performed via a prediction method using the second reference block, determining at least one reference block including the second reference block used to perform the inter prediction, based on a pre-determined condition.

The determining of the at least one reference block based on the pre-determined condition may include determining the second reference block or the first and second reference blocks used to perform the inter prediction, based on at least one of a first condition of a difference between the first reference picture and the second reference picture being smaller than a first threshold value and a second condition of a difference between a size of the first motion vector being smaller than a second threshold value.

The decoding of the current picture may include: generating a third reference picture by using the first reference picture and the second reference picture; and performing the inter prediction on the current prediction block by using a third reference block included in the third reference picture.

The generating of the third reference picture may include: determining a first weight and a second weight by using a nearby sample value of the first reference block and a nearby sample value of the second reference block; and determining the third reference block included in the third reference picture by applying the first weight and the second weight respectively to the first reference block and the second reference block.

The determining of the first weight and the second weight may include determining at least one sample adjacent to a left boundary of the first reference block, and determining the first weight and the second weight by using the at least one sample adjacent to the left boundary of the first reference block.

The decoding of the current picture may include decoding the current picture by performing inter prediction using at least one of the first reference picture and the second reference picture, which are stored in different buffers.

The decoding of the current picture may include decoding the current picture by performing inter prediction using at least one of the first reference picture and the second reference picture, which are stored in a same buffer.

The image decoding method may further include: determining a second motion vector related to the current prediction block from among the at least one prediction block; determining a fourth reference block included in a fourth reference picture, based on the second motion vector; and determining a fifth reference block included in a fifth reference picture, based on the fourth reference block, wherein the fifth reference picture includes a prediction value of the fourth reference picture.

The decoding of the current picture may include performing bi-directional inter prediction on the current prediction block by using at least one of the first and second reference blocks and at least one of the fourth and fifth reference blocks.

According to an aspect of the present disclosure, an image encoding method includes: determining at least one prediction block included in a current picture from among pictures forming an image; determining a first motion vector related to a current prediction block from among the at least one prediction block; determining a first reference block included in a first reference picture, based on the first motion vector; determining a second reference block included in a second reference picture, based on a location of the first reference block; and encoding the current picture by performing inter prediction on the current prediction block by using at least one of the first reference block and the second reference block, wherein the second reference picture includes a prediction value of the first reference picture.

According to an aspect of the present disclosure, an image decoding apparatus includes: a decoder configured to determine at least one prediction block included in a current picture from among pictures forming an image, and determine a first motion vector related to a current prediction block from among the at least one prediction block; and a reference block determiner configured to determine a first reference block included in a first reference picture, based on the first motion vector, and determine a second reference block included in a second reference picture, based on a location of the first reference block, wherein the decoder is further configured to decode the current picture by performing inter prediction on the current prediction block by using at least one of the first reference block and the second reference block, and the second reference picture includes a prediction value of the first reference picture.

According to an aspect of the present disclosure, an image encoding apparatus includes: an encoder configured to determine at least one prediction block included in a current picture from among pictures forming an image, and determine a first motion vector related to a current prediction block from among the at least one prediction block; and a reference block determiner configured to determine a first reference block included in a first reference picture, based on the first motion vector, and determine a second reference block included in a second reference picture, based on a location of the first reference block, wherein the encoder is further configured to encode the current picture by performing inter prediction on the current prediction block by using at least one of the first reference block and the second reference block, and the second reference picture includes a prediction value of the first reference picture.

MODE OF DISCLOSURE

Advantages and features of one or more embodiments of the present disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art.

Terms used herein will now be briefly described and then one or more embodiments of the present disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

As used herein, the singular forms "a," "an" and "the" are intended to include the plural forms as well, unless the context clearly indicates otherwise.

When a part "includes" or "comprises" an element, unless there is a particular description contrary thereto, the part can further include other elements, not excluding the other elements. Also, the term "unit" in the embodiments of the present disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Hereinafter, an "image" may denote a static image such as a still image of a video, or a dynamic image such as a moving image, i.e., a video itself.

Hereinafter, a "sample" denotes data that is assigned to a sampling location of an image and is to be processed. For example, pixel values in an image of a spatial domain or transformation coefficients on a transformation domain may be samples. A unit including at least one sample may be defined as a block.

Reference will now be made in detail to embodiments, examples of which are illustrated in the accompanying drawings. In this regard, the present embodiments may have different forms and should not be construed as being limited to the descriptions set forth herein. In the following description, well-known functions or constructions are not described in detail so as not to obscure the embodiments with unnecessary detail.

FIG. 1A is a block diagram of an image decoding apparatus 100 capable of performing inter prediction on a current prediction block by using at least one of a first reference block and a second reference block by determining the first reference block and the second reference block, according to an embodiment.

Referring to FIG. 1A, the image decoding apparatus 100 may determine at least one prediction block included in a current picture from among pictures forming an image, according to an embodiment. The image decoding apparatus 100 may determine a first motion vector related to a current prediction block from among the at least one prediction block, and determine a first reference block included in a first reference picture based on the first motion vector. Also, the image decoding apparatus 100 may determine a second reference block included in a second reference picture based on a location of the first reference block, and decode the current picture by performing inter prediction on the current prediction block by using at least one of the first and second reference pictures. In detail, a reference block determiner 110 may determine the first reference block based on the first motion vector, and determine the second reference picture based on the location of the first reference block. Also, a decoder 120 of the image decoding apparatus 100 may determine at least one prediction block, determine the first motion vector related to the current prediction block from among the at least one prediction block, and perform inter prediction by using at least one of the determined first and second reference blocks. According to an embodiment, the second reference picture may be a picture including a prediction value of the first reference picture. Processes of decoding an image based on a relationship between the first and second reference pictures will be described below through various embodiments.

Figure 2:
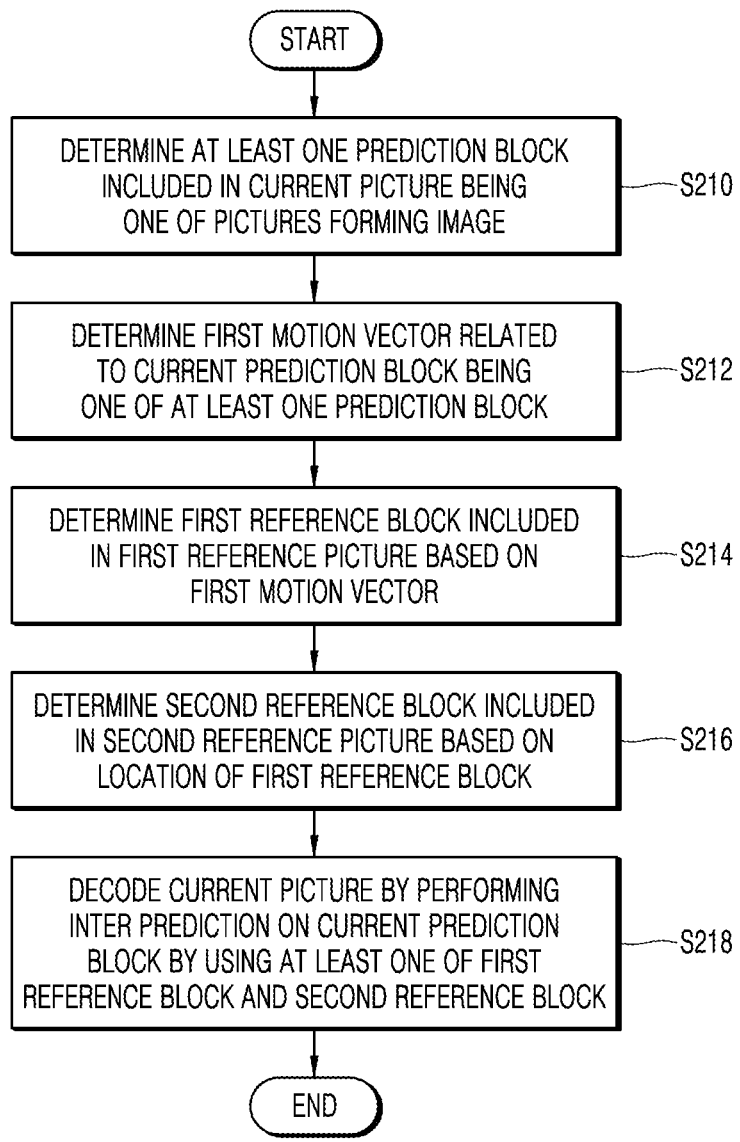
FIG. 2 is a flowchart of a method of decoding, by an image decoding apparatus, an image by using at least one of a first reference block and a second reference block, according to an embodiment.

FIG. 2 is a flowchart of a method of decoding, by the image decoding apparatus 100, an image by using at least one of a first reference block and a second reference block, according to an embodiment.

In operation S210, the decoder 120 may determine at least one prediction block included in a current picture from among pictures forming an image, according to an embodiment. Processes of determining a prediction block may include a process of partitioning the current picture by using various data units, and processes of determining a prediction block based on a largest coding unit or a coding unit will be described below as an example.

In operation S212, the decoder 120 may determine a first motion vector related to a current prediction block from among the at least one prediction block. Processes of determining a motion vector related to a current prediction block may include various decoding processes. For example, the decoder 120 may determine a motion vector of a current prediction block by obtaining information about the motion vector from neighboring blocks adjacent to the current prediction block. In other words, in order to determine the first motion vector related to the current prediction block, the image decoding apparatus 100 may determine a neighboring block from which information about a motion vector is to be obtained by using information or an index obtained from a bitstream, and determine the first motion vector related to the current prediction block by obtaining the information about the motion vector from the determined neighboring block. However, the method of determining the motion vector of the current prediction block described above is only an example, and it may be interpreted that the motion vector determining method may be performed through various methods including the above processes.

In operation S214, the reference block determiner 110 may determine a first reference block included in a first reference picture based on the first motion vector, according to an embodiment. The first reference block on the first reference picture indicated by the first motion vector determined by the decoder 120 may be determined and used as information for determining prediction values of samples included in the current prediction block.

In operation S216, the reference block determiner 110 may determine a second reference block included in a second reference picture based on a location of the first reference block, according to an embodiment. According to an embodiment, the reference block determiner 110 may determine the second reference block on the second reference picture by considering the location of the first reference block on the first reference picture. For example, the reference block determiner 110 may determine the second reference block on the second reference picture at the same location as the first reference block on the first reference picture.

In operation S218, the decoder 120 may decode the current picture by performing inter prediction on the current prediction block by using at least one of the first and second reference blocks, according to an embodiment. According to an embodiment, the decoder 120 may perform the inter prediction on the current prediction block by using the first reference block or by using the first and second reference blocks determined by the reference block determiner 110. The inter prediction is performed based on the first motion vector that may be used for inter prediction of the current prediction block, and thus may correspond to uni-directional prediction. According to an embodiment, the decoder 120 may perform bi-directional prediction related to the current prediction block, and details thereof will be provided below.

Figure 3:
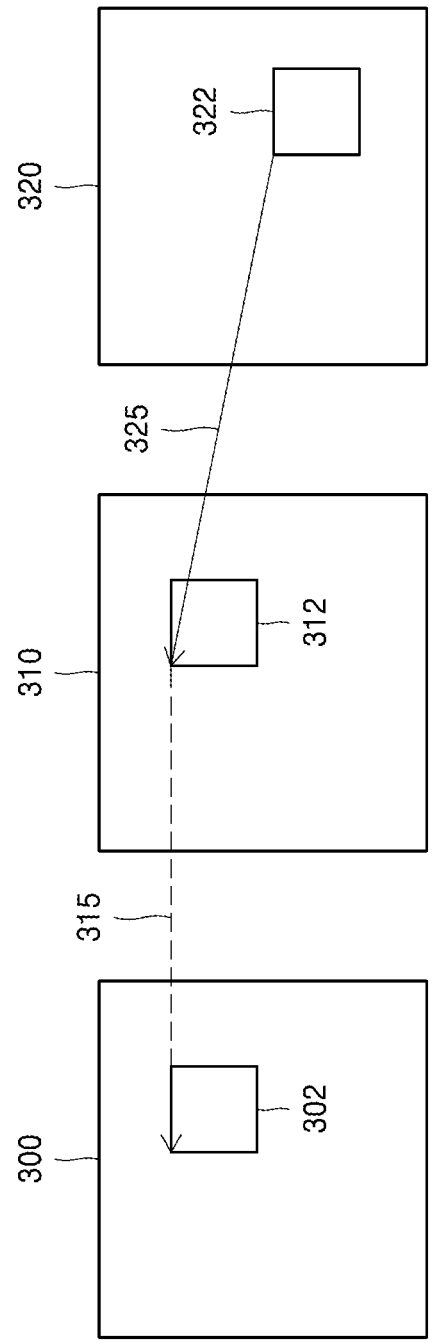
FIG. 3 illustrates processes of performing, by an image decoding apparatus, inter prediction of a current prediction block by using a first reference picture and a second reference picture, according to an embodiment.

FIG. 3 illustrates processes of performing, by the image decoding apparatus 100, inter prediction of a current prediction block 322 by using a first reference picture 310 and a second reference picture 300, according to an embodiment.

Referring to FIG. 3, the decoder 120 of the image decoding apparatus 100 may determine the current prediction block 322 from among at least one prediction block included in a current picture 320. The decoder 120 may determine a first motion vector 325 related to the current prediction block 322, and determine a first reference block 312 on the first reference picture 310 based on the first motion vector 325. In other words, the decoder 120 may determine the first motion vector 325 by using information obtained from a neighboring block of the current prediction block 322, and determine the first reference block 312 on the first reference picture 310 based on the first motion vector 325. According to an embodiment, the decoder 120 may perform inter prediction on the current prediction block 322 by using the first reference picture 310 from among pictures stored in a decoded picture buffer.

According to an embodiment, the image decoding apparatus 100 may perform inter prediction on the current prediction block 322 by using the second reference picture 300 related to the first reference picture 310. The reference block determiner 110 may determine a second reference block 302 on the second reference picture 300 at a same location 315 as the first reference block 312 on the first reference picture 310. According to an embodiment, the second reference picture 300 may include a prediction value determined via motion compensation during a prediction process of the first reference picture 310, and such a prediction value may include information before the first reference picture 310 is reconstructed by adding a residual signal after motion compensation. Details thereof will be provided below through detailed embodiments about decoding processes.

Figure 4:
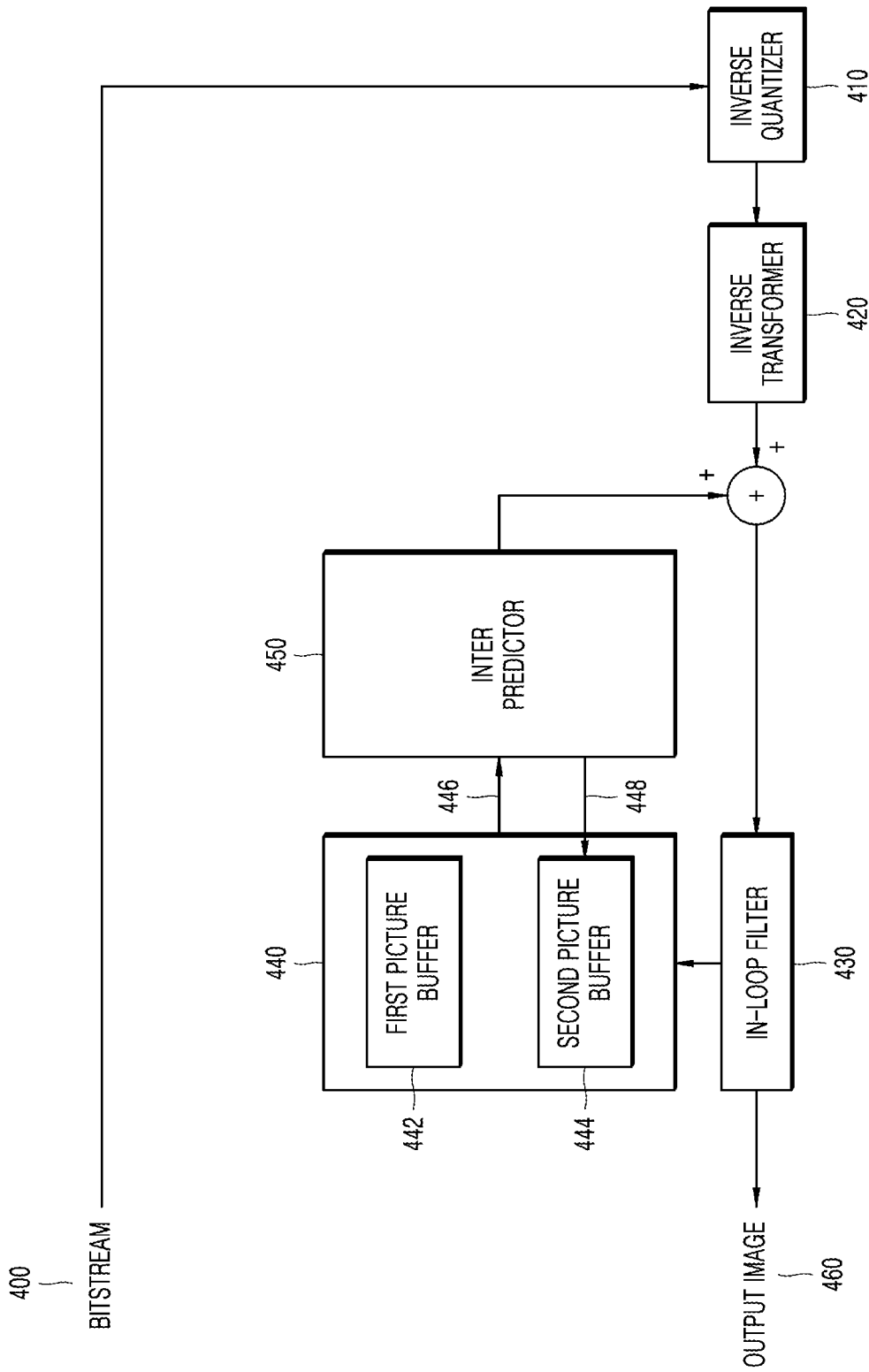
FIG. 4 is a block diagram for describing processes in which an image is decoded by an image decoding apparatus, according to an embodiment.

FIG. 4 is a block diagram for describing processes in which an image is decoded by the image decoding apparatus 100, according to an embodiment.

According to an embodiment, the image decoding apparatus 100 may obtain a residual signal from a bitstream 400. According to an embodiment, the image decoding apparatus 100 may further include a bitstream receiver (not shown) configured to receive the bitstream 400.

According to an embodiment, the image decoding apparatus 100 may include an inverse quantizer 410 configured to inversely quantize the bitstream 400 and an inverse transformer 420 configured to inversely transform inversely quantized information. According to an embodiment, the image decoding apparatus 100 may obtain a result of parsing, from the bitstream 400, data about encoded image data that is to be decoded and encoding information required to decode an image, wherein the encoded image data may be a quantized transformation coefficient. According to an embodiment, the inverse quantizer 410 of the image decoding apparatus 100 may generate, through inverse quantization with respect to an inversely transformed residual signal, a residual signal as data corresponding to data before being quantized during encoding processes. For inverse transformation of each largest coding unit the inverse transformer 420 of the image decoding apparatus 100 may perform, on each coding unit, inverse transformation based on a transform unit by reading, per coding unit, transform unit information according to a tree structure. A pixel value of a spatial domain of a current picture may be reconstructed through inverse transformation. The inverse transformer 420 and the inverse quantizer 410 may be included in the decoder 120 of the image decoding apparatus 100, and accordingly, operations of the inverse transformer 420 and the inverse quantizer 410 may be performed by the decoder 120.

According to an embodiment, an inter predictor 450 of the image decoding apparatus 100 may perform inter prediction on a current prediction block to be decoded. The inter predictor 450 may use a reference picture already reconstructed and stored in a decoded picture buffer 440 so as to determine a prediction value with respect to the current prediction block through inter prediction. The reference picture stored in the decoded picture buffer 440 may be a picture reconstructed as an in-loop filter 430 performs filtering on information reconstructed by adding the residual signal determined through the inverse transformation and inverse quantization to a prediction value of the reference picture. According to an embodiment, the in-loop filter 430 and the inter predictor 450 may be included in the decoder 120, and accordingly, operations of the in-loop filter 430 and the inter predictor 450 described above may be performed by the decoder 120. Hereinafter, a manner in which a first reference picture and a second reference picture are stored in the decoded picture buffer 440 and used as reference pictures that may be used by the current prediction block will be described.

According to an embodiment, the decoded picture buffer 440 of the image decoding apparatus 100 may include a first picture buffer 442 for storing the first reference picture and a second picture buffer 444 for storing the second reference picture. According to an embodiment, the inter predictor 450 of the image decoding apparatus 100 may use at least one of the first reference picture stored in the first picture buffer 442 and the second reference picture stored in the second picture buffer 444, so as to determine the prediction value of the current prediction block included in the current picture. The first reference picture stored in the first picture buffer 442 may include a reconstruction signal generated as in-loop filtering is performed on a result obtained by adding a residual signal related to the first reference picture to a prediction value of the first reference picture. The image decoding apparatus 100 may store, in the second picture buffer 444, the prediction value of the first reference picture before adding the residual signal related to the first reference picture to the prediction value of the first reference picture, and use the prediction value of the first reference picture as the second reference picture while predicting the current picture. By separately storing the first and second reference pictures, an error caused by noise that may be inserted in relation to a residual signal during a reconstruction process of the first reference picture may be controlled, and accordingly, objective and subjective image quality improvement may be obtained.

According to an embodiment, the image decoding apparatus 100 may determine whether to perform inter prediction by using the second reference picture, based on reference block information. In detail, the image decoding apparatus 100 may determine a reference block referred to during the inter prediction with respect to the current prediction block according to an embodiment, and determine whether the second reference picture is used while determining the reference block based on reference block information obtained from the bitstream 400. According to an embodiment, the reference block information may include information indicating which one of the first and second reference block is used to perform the inter prediction on the current prediction block.

Figure 6:
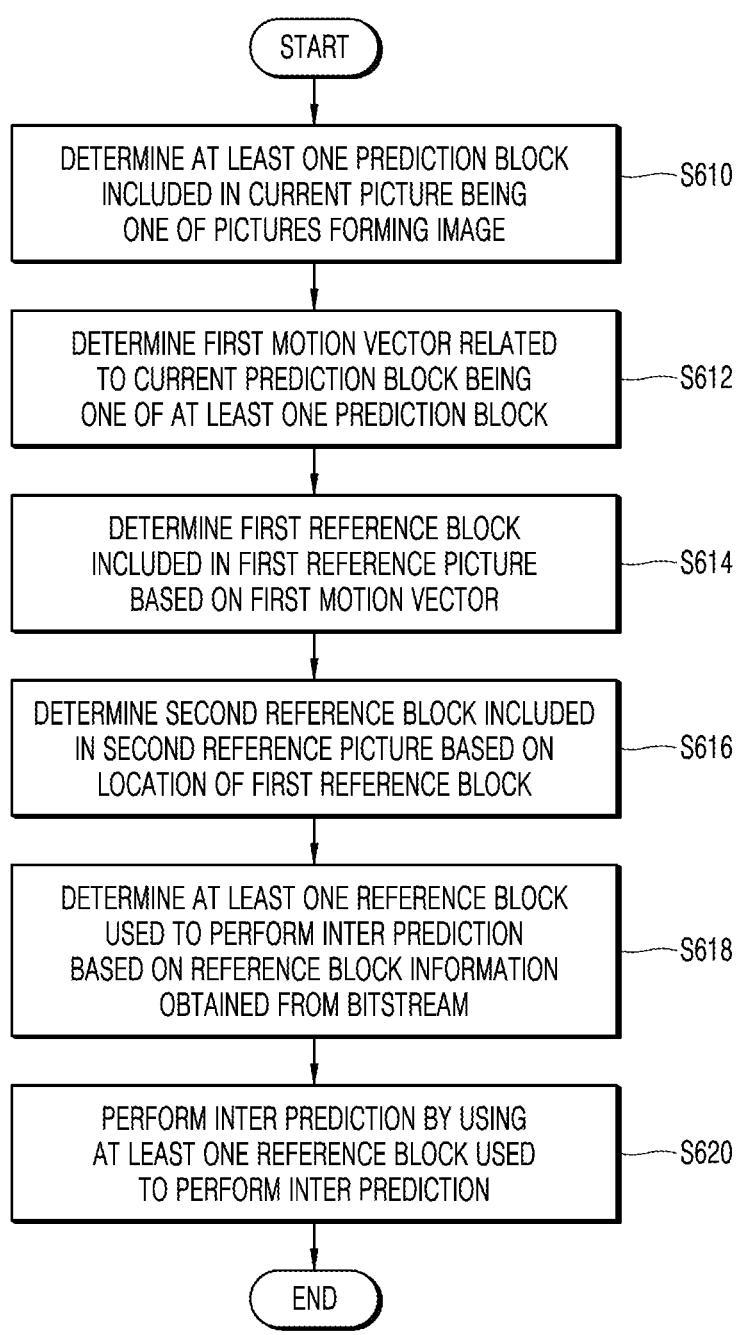
FIG. 6 is a flowchart of a method of performing, by an image decoding apparatus, inter prediction of a current prediction block by using at least one reference block that is determinable based on reference block information, according to an embodiment.

FIG. 6 is a flowchart of a method of performing, by the image decoding apparatus 100, inter prediction of a current prediction block by using at least one reference block that is determinable based on reference block information, according to an embodiment. Since operations S610 through S616 of FIG. 6 may be the same as operations S210 through S216 of FIG. 2, details thereof are not provided again.

According to an embodiment, the image decoding apparatus 10 may determine at least one reference block used to perform inter prediction based on reference block information obtained from a bitstream, in operation S618. For example, the decoder 120 of the image decoding apparatus 100 may determine whether the second reference block is used during the inter prediction based on whether a value of the reference block information is 0 or not. When the reference block information is 0, the reference block determiner 110 may determine, as the reference block used to perform the inter prediction on the current prediction block, the first reference block of the first reference picture indicated by the first motion vector. When the reference block information is 1, the reference block determiner 110 may determine, as the reference block used to perform the inter prediction on the current prediction block, at least one reference block including the second reference block on the second reference picture. In other words, when the reference block information is 1, only the second reference block or both the first and second reference blocks may be used during the inter prediction of the current prediction block, as will be described below. Processes of determining whether to use only the second reference block or both the first and second reference blocks during the inter prediction will be described below through embodiments.

According to an embodiment, the decoder 120 of the image decoding apparatus 100 may perform the inter prediction by using the at least one reference block determined to be used to perform the inter prediction, in operation S620.

Figure 7:
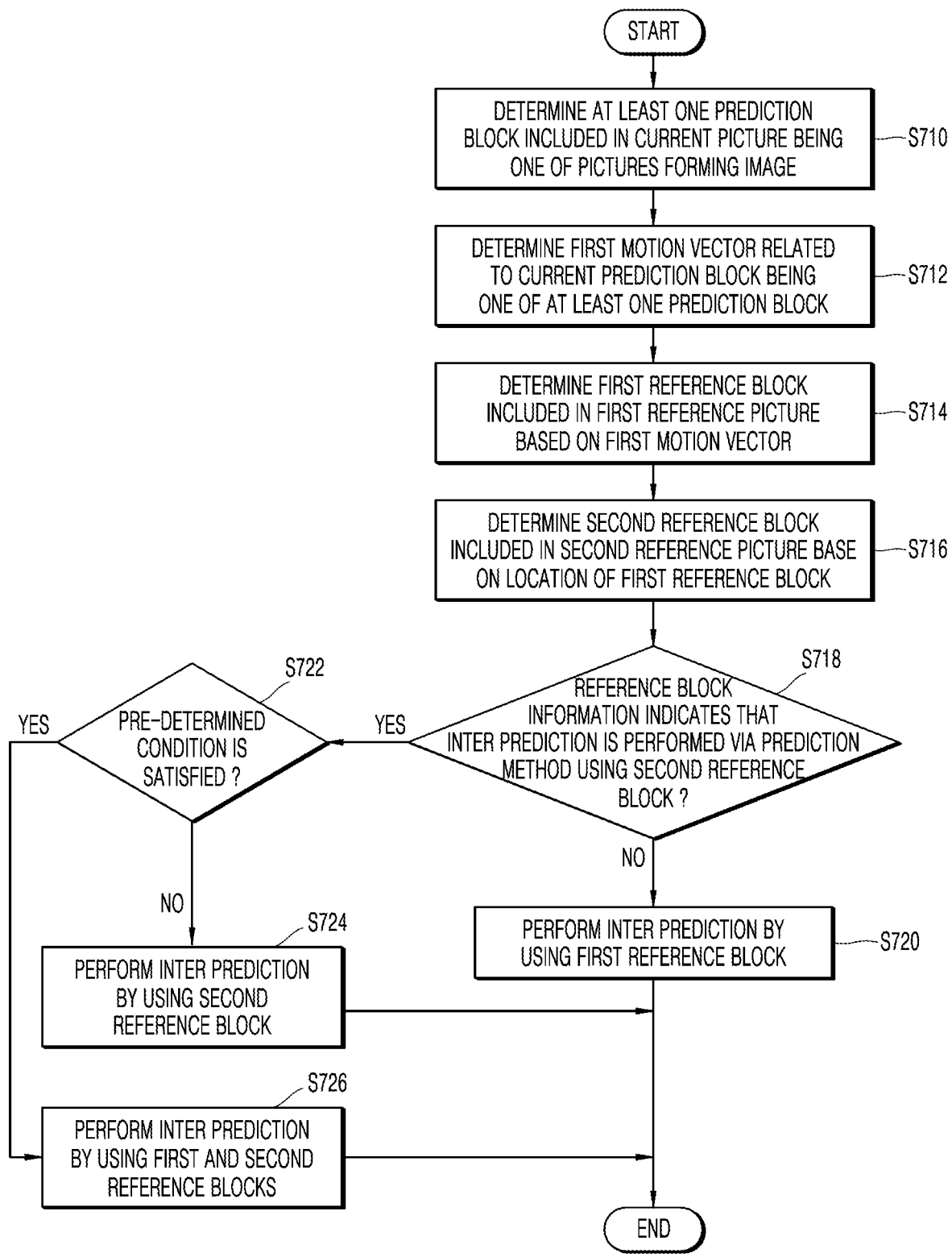
FIG. 7 is a flowchart of detailed processes of determining, by an image decoding apparatus, at least one reference block to be used for inter prediction, according to an embodiment.

FIG. 7 is a flowchart of detailed processes of determining, by the image decoding apparatus 100, at least one reference block to be used for inter prediction, according to an embodiment. Since operations S710 through S716 of FIG. 7 may be the same as operations S210 through S216 of FIG. 2, details thereof are not provided again.

According to an embodiment, the image decoding apparatus 100 may determine whether reference block information indicates that inter prediction is performed via a prediction method using the second reference block, in operation S718.

According to an embodiment, the reference block determiner 110 of the image decoding apparatus 100 may obtain the reference block information from a received bitstream, and determine whether at least one reference block used for inter prediction includes the second reference block. When the reference block information does not indicate that the second reference block is not included in the at least one reference block used for inter prediction, the reference block determiner 110 may determine the first reference block as a reference block to be used to perform inter prediction on the current prediction block, and accordingly, the decoder 120 may perform inter prediction on the current prediction block by using the first reference block in operation S720.

According to an embodiment, when the reference block information indicates that the second reference block is included in the at least one reference block used for inter prediction, the reference block determiner 110 may determine the second reference block as the reference block used to perform inter prediction on the current prediction block. Also, the reference block determiner 110 may determine, in operation S722, whether only the second reference block is used or both the first and second reference blocks are used during inter prediction of the current prediction block.

According to an embodiment, the image decoding apparatus 100 may determine whether a pre-determined condition is satisfied in operation S722 to determine whether only the second reference block is used or both the first and second reference blocks are used during inter prediction of the current prediction block.

According to an embodiment, the reference block determiner 110 of the image decoding apparatus 100 may determine whether the pre-determined condition is satisfied, and such a pre-determined condition may be a combination of at least one condition.

According to an embodiment, the reference block determiner 110 may determine the at least one reference block used for inter prediction by determining, as an example of the pre-determined condition, whether a difference between the first and second reference blocks is smaller than a threshold value (hereinafter, referred to as a first threshold value). According to an embodiment, the reference block determiner 110 of the image decoding apparatus 100 may determine whether a calculation result of adding absolute values of differences between sample values of samples included in the first reference block and sample values of samples included in the second reference block is smaller than the first threshold value. When the calculation result is smaller than the first threshold value, the decoder 120 may perform inter prediction on the current prediction block by using the first and second reference blocks in operation S726, and when the calculation result is equal to or larger than the first threshold value, the decoder 120 may perform inter prediction on the current prediction block by using only the second reference block in operation S724.

According to an embodiment, the reference block determiner 110 may determine the at least one reference block used for inter prediction by determining, as another example of the pre-determined condition, whether a size of the first motion vector related to the current prediction block is smaller than a threshold value (hereinafter, referred to as a second threshold value). According to an embodiment, the reference block determiner 110 of the image decoding apparatus 100 may determine the size of the first motion vector in which the current prediction block indicates the first reference block, and the determined size of the first motion vector may be compared with the second threshold value. Here, the size of the first motion vector may be at least one of a size in a traverse direction and a size in a longitudinal direction of a vector, or may indicate an absolute value of the first motion vector. The decoder 120 may perform inter prediction on the current prediction block by using the first and second reference blocks in operation S726 when the size of the first motion vector is smaller than the second threshold value, and perform inter prediction on the current prediction by using only the second reference block in operation S724 when the size of the first motion vector is equal to or larger than the second threshold value.

According to an embodiment, the image decoding apparatus 100 may determine whether only the second reference block is used or both the first and second reference blocks are used during inter prediction of the current prediction block by combining pre-determined conditions. For example, the reference block determiner 110 of the image decoding apparatus 100 may determine the at least one reference block used for inter prediction by determining, as a first condition, whether the difference between the first and second reference blocks is smaller than the first threshold value, and as a second condition, whether the size of the first motion vector related to the current prediction block is smaller than the second threshold value. According to an embodiment, the reference block determiner 110 may determine that the first and second reference blocks are used to perform inter prediction on the current prediction block when the first and second conditions are both satisfied.

According to an embodiment, the reference block determiner 110 may determine that the first and second reference blocks are used during inter prediction of the current prediction block based on the pre-determined conditions, and in this case, the reference block determiner 110 may generate a third reference block, i.e., a new reference block, by using information included in the first and second reference blocks, and use the third reference block for inter prediction. Processes of determining the third reference block will be described below.

FIG. 8A is a diagram for describing processes of determining at least one of a first reference block and a second reference block as at least one reference block used to perform inter prediction of a current prediction block, according to an embodiment.

According to an embodiment, the decoder 120 of the image decoding apparatus 100 may determine a current prediction block 822 from among at least one prediction block included in a current picture 820. The decoder 120 may determine a first motion vector 825 related to the current prediction block 822, and determine a first reference block 812 on a first reference picture 810 based on the first motion vector 825. In other words, the decoder 120 may determine the first motion vector 825 by using information obtained from a neighboring block of the current prediction block 822, and determine the first reference block 812 on the first reference picture 810 based on the first motion vector 825. According to an embodiment, the decoder 120 may perform inter prediction on the current prediction block 822 by using the first reference picture 810 from among pictures stored in a decoded picture buffer. According to an embodiment, the image decoding apparatus 100 may perform inter prediction of the current prediction block 822 by using a second reference picture 800 related to the first reference picture 810. The reference block determiner 110 may determine a second reference block 802 on the second reference picture 800 at a same location 815 as the first reference block 812 on the first reference picture 810. According to an embodiment, the second reference picture 800 may include a prediction value determined via motion compensation during a prediction process of the first reference picture 810.

Referring to FIG. 8A, the reference block determiner 110 of the image decoding apparatus 100 may determine a reference block to be used during inter prediction of the current prediction block 822 by referring to nearby samples of the current prediction block 822, the first reference block 812, and the second reference block 802. Blocks that may be referred to may be the first and second reference blocks 812 and 802, and in addition, may be a third reference block that is newly determined by using information included in the first and second reference blocks 812 and 802. In order to generate the third reference block, the reference block determiner 110 may use a nearby sample 824 (hereinafter, referred to as P0) of the current prediction block 822, a nearby sample 814 (hereinafter, referred to as P1) of the first reference block 812, and a nearby sample 804 (hereinafter, referred to as P2) of the second reference block 802. According to an embodiment, values of P0, P1, and P2 used by the reference block determiner 110 may be averages of already-decoded sample values adjacent to left boundaries of the current prediction block 822, the first reference block 812, and the second reference block 802. Here, definitions of P0, P1, and P2 are only examples for describing that sample values adjacent to the current prediction block 822, the first reference block 812, and the second reference block 802 may be used while determining a reference block, and thus P0, P1, and P2 may not only be averages of sample values adjacent to the left boundaries, but may alternatively be averages of sample values adjacent to boundaries in another direction or maximum or minimum values of adjacent samples. For convenience of description, in the following embodiments, it is described that P0, P1, and P2 are the averages of sample values adjacent to the left boundaries of the current prediction block 822, the first reference block 812, and the second reference block 802, respectively.

According to an embodiment, the reference block determiner 110 may use a following equation to generate a third reference block.

$$(W1*Pred+W2*Pred')/(W1+W2)=Pred'' \quad \text{[Equation 1]}$$

Here, Pred denotes a first reference block, Pred' denotes a second reference block, Pred'' denotes a third reference block, and W1 and W2 denote weights applied to each reference block. According to an embodiment, the reference block determiner 110 may determine the weights W1 and W2 based on P0, P1, and P2. According to an embodiment, the reference block determiner 110 may determine the weights W1 and W2 satisfying a following equation.

$$(W1*P1+W2*P2)/(W1+W2)=P0 \quad \text{[Equation 2]}$$

According to an embodiment, since P0, P1, and P2 may be determined by the already-decoded sample values and thus may be already known, the reference block determiner 110 may determine a ratio W1 to W2 based on Equation 2. The reference block determiner 110 may determine the third reference block by applying, to Equation 1, the ratio of W1 to W2 determined according to Equation 2. For example, when a value of P0 is 4, a value of P1 is 3.5, and a value of P2 is 4.5, (W1*3.5+W2*4.5)/(W1+W2) should be 4, and thus the ratio of W1 to W2 is determined to be 1:1 (W1=W2). The reference block determiner 110 may determine the third reference block by applying ((Pred+Pred')/2=Pred''), to Equation 1, the ratio of W1 to W2 determined by using Equation 2.

FIG. 8B illustrates bi-directional prediction being performed for inter prediction of a current prediction block, according to an embodiment.

According to an embodiment, the decoder 120 of the image decoding apparatus 100 may determine a current prediction block 872 from among at least one prediction block included in a current picture 870. The decoder 120 may determine that inter prediction to be performed on the current prediction block 872 is bi-directional prediction. According to an embodiment, the decoder 120 may determine whether uni-directional prediction or bi-directional prediction is to be performed on the current prediction block 872 based on information obtained from a bitstream. According to an embodiment, the information obtained from the bitstream may be obtained from the bitstream according to certain data units (for example, pictures, slices, slice segments, or largest coding units). The decoder 120 may determine a first motion vector 875 and a second motion vector 895 related to the current prediction block 872. In addition, the decoder 120 may determine a first reference block 862 on a first reference picture 860 based on the first motion vector 875, and determine a fourth reference block 892 on a fourth reference picture 890 based on the second motion vector 895. In other words, the decoder 120 may determine the first motion vector 875 and the second motion vector 895 by using information obtained from a neighboring block of the current prediction block 872, and determine the first reference block 862 on the first reference picture 860 and the fourth reference block 892 on the fourth reference picture 890 based on the first and second motion vectors 875 and 895 to preform bi-directional prediction.

According to an embodiment, the image decoding apparatus 100 may perform inter prediction on the current prediction block 872 by using a second reference picture 850 related to the first reference picture 860 and a fifth reference picture 880 related to the fourth reference picture 890. The reference block determiner 110 may determine a second reference block 852 on the second reference picture 850 at a same location 865 as the first reference block 862 on the first reference picture 860, and determine a fifth reference block 882 on the fifth reference picture 880 at a same location 885 as the fourth reference block 892 on the fourth reference picture 890. According to an embodiment, the second reference picture 850 and the fifth reference picture 880 may include prediction values determined via motion compensation during prediction processes of the first reference picture 860 and the fourth reference picture 890, respectively. Since features between the first reference picture 860 and the second reference picture 850, or features between the fourth reference picture 890 and the fifth reference picture 880 have been described above through various embodiments, details thereof are not provided again.

according to an embodiment, the reference block determiner 110 of the image decoding apparatus 100 may determine a reference block to be used during inter prediction of the current prediction block 872 by referring to the current prediction block 872, the first reference block 862, the second reference block 852, the fourth reference block 892, and the fifth reference block 882. According to an embodiment, the reference block determiner 110 may use a third reference block newly determined by using information included in the first and second reference blocks 862 and 852, and in addition, may further use a sixth reference block newly determined by using information included in the fourth and fifth reference blocks 892 and 882. In order to generate the third reference block, the reference block determiner 110 may use a nearby sample 874 (hereinafter, referred to as P0) of the current prediction block 872, a nearby sample 864 (hereinafter, referred to as P1) of the first reference block 862, and a nearby sample 854 (hereinafter, referred to as P2) of the second reference block 852. In addition, in order to generate the sixth reference bock, the reference block determiner 110 may use P0, i.e., the nearby sample 874 of the current prediction block 872, a nearby sample 894 (hereinafter, referred to as P3) of the fourth reference block 892, and a nearby sample 884 (hereinafter, referred to as P4) of the fifth reference block 882. According to an embodiment, values of P0, P1, and P2 used by the reference block determiner 110 may be averages of already-decoded sample values adjacent to left boundaries of the current prediction block 872, the first reference block 862, and the second reference block 852, and values of P3 and P4 may be averages of already-decoded sample values adjacent to left boundaries of the fourth and fifth reference blocks 892 and 882.

According to an embodiment, the reference block determiner 110 may perform processes of determining weights W1 and W2 and generating a third reference block by using Equations 1 and 2, and in addition, when inter prediction to be performed on the current prediction block 872 is bi-directional prediction, may generate a sixth reference block by performing weight determining processes using Equations 1 and 2 with respect to the fourth and fifth reference blocks 892 and 882. According to an embodiment, values of the weights W1 and W2 related to the first and second reference blocks 862 and 852 used in Equation 1 may be different from those related to the fourth and fifth reference blocks 892 and 882. Processes of the reference block determiner 110 generating the sixth reference block by performing, on the fourth and fifth reference blocks 892 and 882, the weight determining processes using Equations 1 and 2 may be similar to the processes of the reference block determiner 110 generating the third reference block by substituting the weights W1 and W2 determined through Equation 2 for Equation 1 described above with reference to FIG. 8A, and thus details thereof are not provided again.

FIG. 9 illustrates a method of generating a noise reduced reference picture by using a first reference picture and a second reference picture, according to an embodiment.

According to an embodiment, a first reference picture 900 and a second reference picture 902 may be stored in one decoded picture buffer 930. According to another embodiment, the first and second reference pictures 900 and 902 may be stored in picture buffers (for example, picture buffers 930 and 940) that are distinguished from each other.

According to an embodiment, the decoder 120 may perform filtering 903 by using the first and second reference pictures 900 and 902 to generate a noise reduced reference picture 904 in which noise is reduced, and store the noise reduced reference picture 904 in the picture buffer 930 or 940. Here, the noise reduced reference picture 904 may correspond to a third reference picture that may be generated according to the above embodiments.

According to an embodiment, the decoder 120 may determine that bi-directional prediction is performed as inter prediction to be performed on a current prediction block. When it is determined that bi-directional prediction is performed on the current prediction block, the decoder 120 may use not only the first and second reference pictures 900 and 902 stored in the picture buffer 930 or 940, and the noise reduced reference picture 904, i.e., the third reference picture, but also a fourth reference picture 910, a fifth reference picture 912, and a sixth reference picture 914, i.e., a noise reduced reference picture.

According to an embodiment, the decoder 120 may perform a filtering process before a reference picture to be used for inter prediction of a current prediction block is stored in a picture buffer. A reference picture including a prediction value obtained via motion compensation according to an embodiment may include an error, such as a blocking artefact, at a boundary of data units that may be units of transforming processes, and filtering (for example, deblocking filtering) may be performed to reduce the error. In other words, the decoder 120 may perform filtering not only on a first reference picture, but also on a second reference picture including a motion compensation result with respect to the first reference picture, and then store the first and second reference pictures in a picture buffer. In addition, the decoder 120 may perform filtering on a third reference picture that may be generated by using the first and second reference pictures, and then store the third reference picture in the picture buffer. As such, by reducing an error, such as a blocking artefact, during reconstruction processes of a current picture including the current prediction block by using, during inter prediction, the reference picture stored after filtering is performed, objective and subjective quality improvement may be obtained.

According to an embodiment, operations of the reference block determiner 110 and operations of the decoder 120 described above according may be performed by the decoder 120 or a processor (central processing unit (CPU)).

Various embodiments described above include features that may be used by the image decoding apparatus 100 for image decoding. Hereinafter, features that may be used by an image encoding apparatus 150 for image encoding will be described as various embodiments related to decoding processes performed by the image decoding apparatus 100.

Figure 1B:
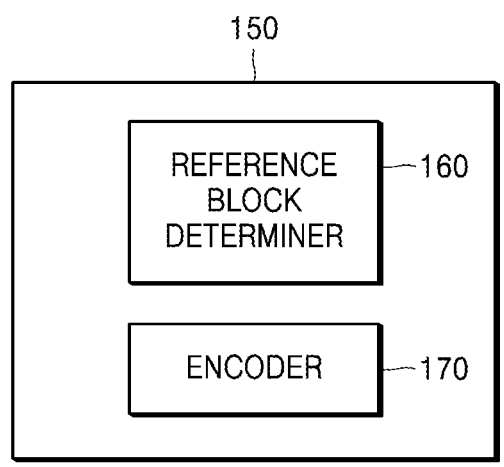
FIG. 1B is a block diagram of an image encoding apparatus capable of performing inter prediction on a current prediction block by using at least one of a first reference block and a second reference block by determining the first reference block and the second reference block, according to an embodiment.

FIG. 1B is a block diagram of an image encoding apparatus 150 capable of performing inter prediction on a current prediction block by using at least one of a first reference block and a second reference block by determining the first reference block and the second reference block, according to an embodiment.

Referring to FIG. 1B, the image encoding apparatus 150 may determine at least one prediction block included in a current picture from among pictures forming an image, according to an embodiment. The image encoding apparatus 150 may determine a first motion vector related to a current prediction block from among the at least one prediction block, and determine a first reference block included in a first reference picture based on the first motion vector. Also, the image encoding apparatus 150 may determine a second reference block included in a second reference picture based on a location of the first reference block, and encode the current picture by performing inter prediction on the current prediction block by using at least one of the first and second reference blocks. In detail, a reference block determiner 160 of the image encoding apparatus 150 may determine the first reference block based on the first motion vector, and determine the second reference picture based on the location of the first reference block. Also, an encoder 170 of the image encoding apparatus 150 may determine the at least one prediction block, determine the first motion vector related to the current prediction block from among the at least one prediction block, and perform inter prediction by using at least one of the determined first and second reference blocks. According to an embodiment, the second reference picture may be a picture including a prediction value of the first reference picture.

Figure 5:
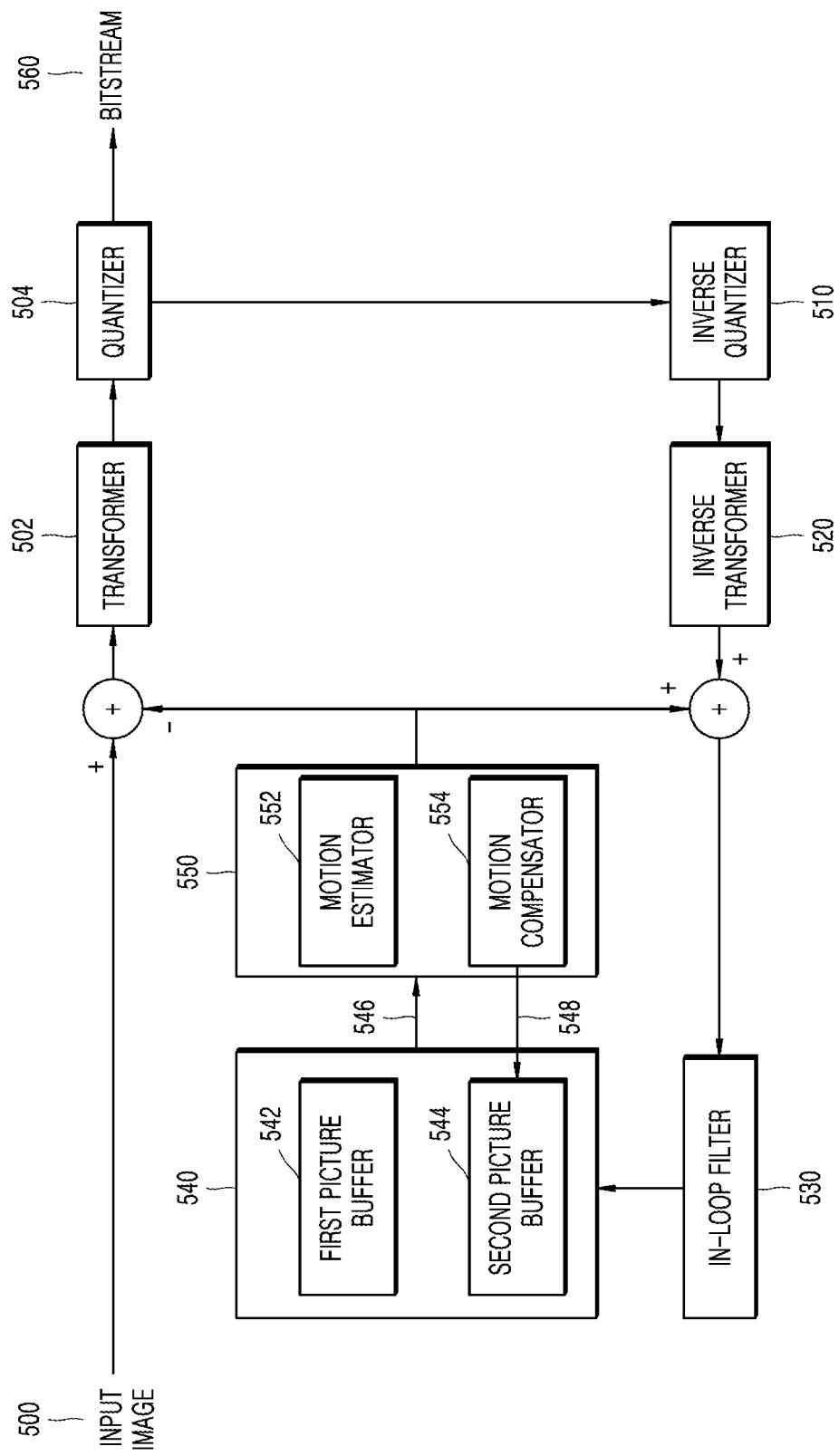
FIG. 5 is a block diagram for describing processes in which an image is encoded by an image encoding apparatus, according to an embodiment.

FIG. 5 is a block diagram for describing processes in which an image is encoded by the image encoding apparatus 150, according to an embodiment.

According to an embodiment, the image encoding apparatus 150 may determine a residual signal that is a result of subtracting a prediction value from an input image 500. A transformer 502 may perform transformation on the residual signal to convert spatial information to information about a transformation domain, and a quantizer 504 may perform quantization on such a transformation result. A bitstream 560 including the quantized information may be transmitted to the image decoding apparatus 100. Inverse transformation and inverse quantization may be performed on the transformed and quantized residual signal so as to be stored in a decoded picture buffer 540 as a reference picture used during prediction processes. The image encoding apparatus 150 may include an inverse quantizer 510 for inversely quantizing inversely transformed information, and an inverse transformer 520 for inverse transformation. According to an embodiment, encoded image data, i.e., information to be inversely transformed and inversely quantized by the image encoding apparatus 150, may include a quantized transformation coefficient. According to an embodiment, the inverse quantizer 510 of the image encoding apparatus 150 may generate a residual signal as data corresponding to data before being quantized during encoding processes, through inverse quantization with respect to the inversely transformed residual signal. For inverse transformation per largest coding unit, the inverse transformer 520 of the image encoding apparatus 150 may perform, on each coding unit, inverse transformation based on a transform unit by reading, per coding unit, transform unit information according to a tree structure. A pixel value of a spatial domain of a current picture may be reconstructed through inverse transformation. The inverse quantizer 510 and the inverse transformer 520 may be included in the encoder 170 of the image encoding apparatus 150, and accordingly, operations of the inverse quantizer 510 and the inverse transformer 520 described above may be performed by the encoder 170. Since features of operations of the inverse quantizer 510 and the inverse transformer 520 of the image encoding apparatus 150 may be similar to features of operations of the inverse quantizer 410 and the inverse transformer 420 of the image decoding apparatus 100, details thereof are not provided again.

According to an embodiment, the decoded picture buffer 540 of the image encoding apparatus 150 may include a first picture buffer 542 for storing a first reference picture and a second picture buffer 544 for storing a second reference picture. According to an embodiment, an inter predictor 550 of the image encoding apparatus 150 may use at least one of the first reference picture stored in the first picture buffer 542 and the second reference picture stored in the second picture buffer 544 so as to determine a prediction value of a current prediction block included in a current picture. The first reference picture stored in the first picture buffer 542 may include a reconstruction signal generated as in-loop filtering is performed on a result obtained by adding a residual signal related to the first reference picture to a prediction value of the first reference picture. The image encoding apparatus 150 may store, in the second picture buffer 544, the prediction value of the first reference picture before adding the residual signal related to the first reference picture to the prediction value of the first reference picture, and use the prediction value of the first reference picture as the second reference picture while predicting the current picture.

According to an embodiment, the inter predictor 550 of the image encoding apparatus 150 may include a motion estimator 552 for determining a motion vector related to the current prediction block, and a motion compensator 554 for determining a prediction value by using the determined motion vector. In other words, a portion on a reference picture indicated by a motion vector that may be determined via motion estimation may be determined, and the portion may be determined as a reference block. The motion compensator 554 may determine the prediction value of the current prediction block by using information about the determined reference block.

The image encoding apparatus 150 according to an embodiment may perform inter prediction on the current prediction block by using a motion compensation result of the first reference picture indicated by the motion vector with respect to the current prediction block. In detail, the motion estimator 552 of the image encoding apparatus 150 may determine motion vectors of prediction blocks of the first reference picture, and the motion compensator 554 may perform motion compensation by using information about another reference picture indicated by such prediction blocks of the first reference block. The encoder 170 of the image encoding apparatus 150 stores a prediction value, i.e., a result of performing the motion compensation on the first reference block, in the second picture buffer 544 so as to use the second reference picture, i.e., a reference picture separate from the first reference picture stored in the first picture buffer 542, during inter prediction of the current prediction block.

Remaining features of operations of the reference block determiner 160 and the encoder 170 included in the image encoding apparatus 150 may be features of operations similar to or the reverse of those performed by the reference block determiner 110 and the decoder 120 included in the image decoding apparatus 100, and thus details thereof are not provided again.

According to an embodiment, operations of the reference block determiner 160 and operations of the encoder 170 described above may be performed by the encoder 170 or a processor (CPU).

Hereinafter, a method of determining a data unit that may be used while the image decoding apparatus 100 according to an embodiment decodes an image will be described with reference to FIGS. 10 through 23. Operations of the image encoding apparatus 150 may be similar to or the reverse of various embodiments of operations of the image decoding apparatus 100 described below.

Figure 10:
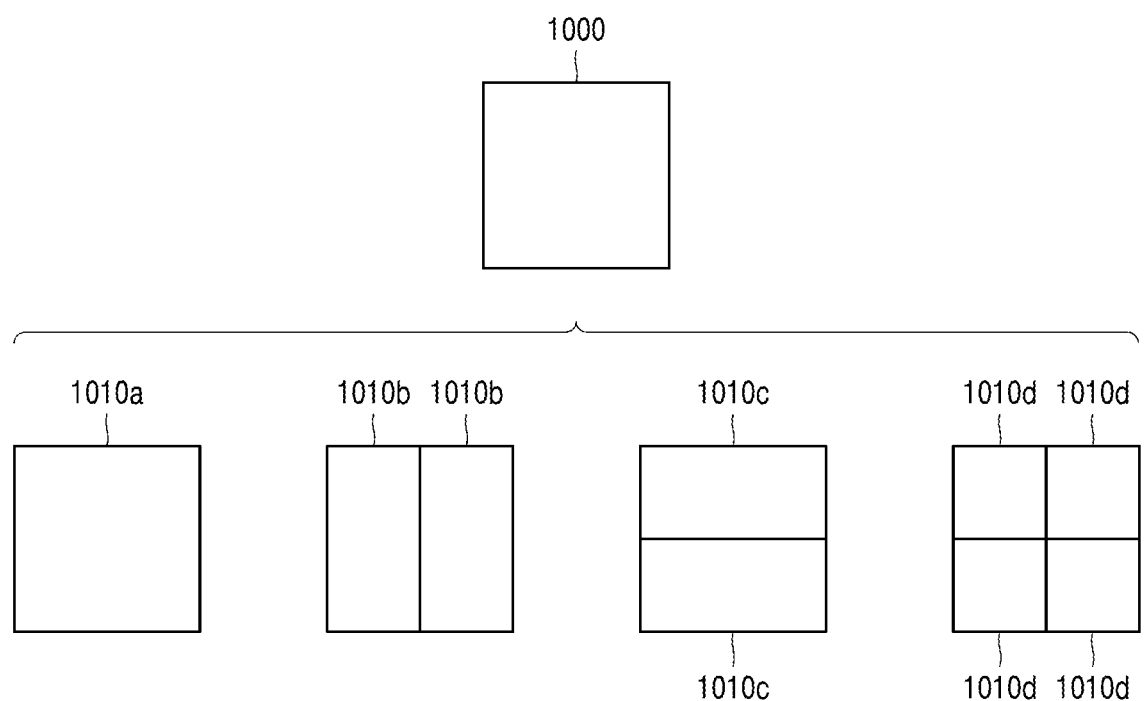
FIG. 10 illustrates processes of determining at least one coding unit as a current coding unit is partitioned, according to an embodiment.

FIG. 10 illustrates processes of determining at least one coding unit as the image decoding apparatus 100 partitions a current coding unit, according to an embodiment.

According to an embodiment, the image decoding apparatus 100 may determine a shape of a coding unit by using block shape information, and determine a shape into which a coding unit is partitioned by using partition shape information. In other words, a partitioning method ( ) of a coding unit, which is indicated by the partition shape information, may be determined based on a block shape indicated by the block shape information used by the image decoding apparatus 100.

According to an embodiment, the image decoding apparatus 100 may use block shape information indicating that a current coding unit has a square shape. For example, the image decoding apparatus 100 may determine, according to partition shape information, whether to not partition a square coding unit, to partition the square coding unit vertically, to partition the square coding unit horizontally, or to partition the square coding unit into four coding units. Referring to FIG. 10, when block shape information of a current coding unit 1000 indicates a square shape, the decoder 120 may not partition a coding unit 1010a having the same size as the current coding unit 1000 according to partition shape information indicating non-partition, or determine coding units 1010b, 1010c, or 1010d based on partition shape information indicating a certain partitioning method.

Referring to FIG. 10, the image decoding apparatus 100 may determine two coding units 1010b by partitioning the current coding unit 1000 in a vertical direction based on partition shape information indicating a partition in a vertical direction, according to an embodiment. The image decoding apparatus 100 may determine two coding units 1010c by partitioning the current coding unit 1000 in a horizontal direction based on partition shape information indicating a partition in a horizontal direction. The image decoding apparatus 100 may determine four coding units 1010d by partitioning the current coding unit 1000 in vertical and horizontal directions based on partition shape information indicating partitioning in vertical and horizontal directions. However, a partition shape into which a square coding unit may be partitioned is not limited to the above shapes, and may include any shape indicatable by partition shape information. Certain partition shapes into which a square coding unit are partitioned will now be described in detail through various embodiments.

FIG. 11 illustrates processes of determining at least one coding unit when the image decoding apparatus 100 partitions a coding unit having a non-square shape, according to an embodiment.

According to an embodiment, the image decoding apparatus 100 may use block shape information indicating that a current coding unit has a non-square shape. The image decoding apparatus 100 may determine, according to partition shape information, whether to not partition the non-square current coding unit or to partition the non-square current coding unit via a certain method. Referring to FIG. 11, when block shape information of a current coding unit 1100 or 1150 indicates a non-square shape, the image decoding apparatus 100 may not partition coding units 1110 or 1160 having the same size as the current coding unit 1100 or 1150 according to partition shape information indicating non-partition, or determine coding units 1120a, 1120b, 1130a, 1130b, 1130c, 1170a, 1170b, 1180a, 1180b, and 1180c based on partition shape information indicating a certain partitioning method. A certain partitioning method of partitioning a non-square coding unit will now be described in detail through various embodiments.

According to an embodiment, the image decoding apparatus 100 may determine a shape into which a coding unit is partitioned by using partition shape information, and in this case, the partition shape information may indicate the number of at least one coding unit generated as the coding unit is partitioned. Referring to FIG. 11, when partition shape information indicates that the current coding unit 1100 or 1150 is partitioned into two coding units, the image decoding apparatus 100 may determine two coding units 1120a and 1120b or 1170a and 1170b included in the current coding unit 1100 or 1150 by partitioning the current coding unit 1100 or 1150 based on the partition shape information.

According to an embodiment, when the image decoding apparatus 100 partitions the current coding unit 1100 or 1150 having a non-square shape based on partition shape information, the image decoding apparatus 100 may partition the current coding unit 1100 or 1150 considering locations of long sides of the current coding unit 1100 or 1150 having a non-square shape. For example, the image decoding apparatus 100 may determine a plurality of coding units by partitioning the current coding unit 1100 or 1150 in a direction of partitioning the long sides of the current coding unit 1100 or 1150 considering a shape of the current coding unit 1100 or 1150.

According to an embodiment, when partition shape information indicates that a coding unit is partitioned into an odd number of blocks, the image decoding apparatus 100 may determine the odd number of coding units included in the current coding unit 1100 or 1150. For example, when partition shape information indicates that the current coding unit 1100 or 1150 is partitioned into three coding units, the image decoding apparatus 100 may partition the current coding unit 1100 or 1150 into three coding units 1130a through 1130c or 1180a through 1180c. According to an embodiment, the image decoding apparatus 100 may determine the odd number of coding units included in the current coding unit 1100 or 1150, and the sizes of the determined coding units may not be all the same. For example, the size of coding unit 1130b or 1180b from among the determined odd number of coding units 1130a through 1130c or 1180a through 1180c may be different from the sizes of coding units 1130a and 1130c or 1180a and 1180c. In other words, coding units that may be determined when the current coding unit 1100 or 1150 is partitioned may have a plurality of types of sizes, and in some cases, the coding units 1130a through 1130c or 1180a through 1180c may have different sizes.

According to an embodiment, when partition shape information indicates that a coding unit is partitioned into an odd number of blocks, the image decoding apparatus 100 may determine the odd number of coding units included in the current coding unit 1100 or 1150, and in addition, may set a certain limit on at least one coding unit from among the odd number of coding units generated via partitioning. Referring to FIG. 11, the image decoding apparatus 100 may differentiate decoding processes performed on the coding unit 1130*b* or 1180*b* located at the center from among the three coding units 1130*a* through 1130*c* or 1180*a* through 1180*c* generated as the current coding unit 1100 or 1150 is partitioned from the other coding units 1130*a* and 1130*c* or 1180*a* and 1180*c*. For example, the image decoding apparatus 100 may limit the coding unit 1130*b* or 1180*b* located at the center to be no longer partitioned unlike the other coding units 1130*a* and 1130*c* or 1180*a* and 1180*c*, or to be partitioned only a certain number of times.

Figure 12:
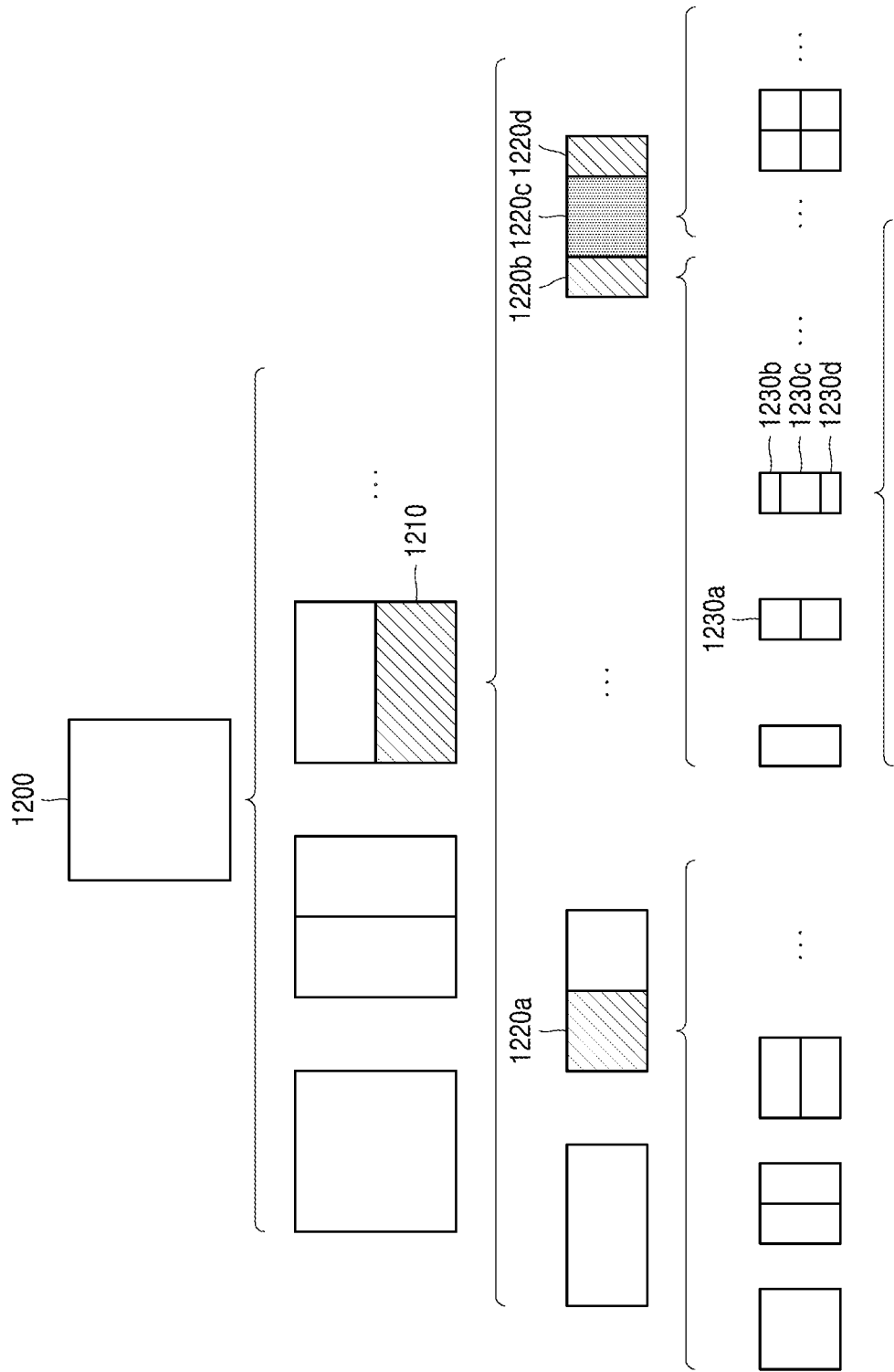
FIG. 12 illustrates processes of partitioning a coding unit, based on at least one of a block shape information and partition shape information, according to an embodiment.

FIG. 12 illustrates processes of the image decoding apparatus 100 partitioning a coding unit, based on at least one of a block shape information and partition shape information, according to an embodiment.

According to an embodiment, the image decoding apparatus 100 may determine that a first coding unit 1200 having a square shape is partitioned or not partitioned into coding units, based on at least one of block shape information and partition shape information. According to an embodiment, when partition shape information indicates that the first coding unit 1200 is partitioned in a horizontal direction, the image decoding apparatus 100 may determine a second coding unit 1210 by partitioning the first coding unit 1200 in a horizontal direction. A first coding unit, a second coding unit, and a third coding unit used according to an embodiment are terms used to indicate a relation between before and after partitioning a coding unit. For example, a second coding unit may be determined by partitioning a first coding unit, and a third coding unit may be determined by partitioning a second coding unit. Hereinafter, it will be understood that relations between first through third coding units are in accordance with the features described above.

According to an embodiment, the image decoding apparatus 100 may determine that the determined second coding unit 1210 is partitioned or not partitioned into coding units based on at least one of block shape information and partition shape information. Referring to FIG. 12, the image decoding apparatus 100 may partition the second coding unit 1210, which has a non-square shape and is determined by partitioning the first coding unit 1200, into at least one third coding unit 1210*a*, 1220*b*, 1220*c*, or 1220*d*, or may not partition the second coding unit 1210, based on at least one of block shape information and partition shape information. The image decoding apparatus 100 may obtain at least one of the block shape information and the partition shape information, and obtain a plurality of second coding units (for example, the second coding units 1210) having various shapes by partitioning the first coding unit 1200 based on at least one of the obtained block shape information and partition shape information, wherein the second coding unit 1210 may be partitioned according to a method of partitioning the first coding unit 1200 based on at least one of the block shape information and the partition shape information. According to an embodiment, when the first coding unit 1200 is partitioned into the second coding units 1210 based on at least one of block shape information and partition shape information with respect to the first coding unit 1200, the second coding unit 1210 may also be partitioned into third coding units (for example, the third coding units 1220*a* through 1220*d*) based on at least one of block shape information and partition shape information with respect to the second coding unit 1210. In other words, a coding unit may be recursively partitioned based on at least one of partition shape information and block shape information related to each coding unit. Accordingly, a square coding unit may be determined from a non-square coding unit, and such a square coding unit may be recursively partitioned such that a non-square coding unit is determined. Referring to FIG. 12, a certain coding unit (for example, a coding unit located at the center or a square coding unit) from among the odd number of third coding units 1220*b* through 1220*d* determined when the second coding unit 1210 having a non-square shape is partitioned may be recursively partitioned. According to an embodiment, the third coding unit 1220*c* having a square shape from among the third coding units 1220*b* through 1220*d* may be partitioned in a horizontal direction into a plurality of fourth coding units. A fourth coding unit having a non-square shape from among the plurality of fourth coding units may again be partitioned into a plurality of coding units. For example, the fourth coding unit 1240 having a non-square shape may be partitioned into an odd number of coding units.

A method that may be used to recursively partitioned a coding unit will be described below through various embodiments.

According to an embodiment, the image decoding apparatus 100 may determine that each of the third coding units 1220*a* through 1220*d* is partitioned into coding units or that the second coding unit 1210 is not partitioned, based on at least one of block shape information and partition shape information. The image decoding apparatus 100 may partition the second coding unit 1210 having a non-square shape into the odd number of third coding units 1220*b* through 1220*d*, according to an embodiment. The image decoding apparatus 100 may set a certain limit on a certain third coding unit from among the third coding units 1220*b* through 1220*d*. For example, the image decoding apparatus 100 may limit that the third coding unit 1220*c* located at the center of the third coding units 1220*b* through 1220*d* is no longer partitioned, or is partitioned into a settable number of times. Referring to FIG. 12, the image decoding apparatus 100 may limit that the third coding unit 1220*c* located at the center of the third coding units 1220*b* through 1220*d* included in the second coding unit 1210 having a non-square shape is no longer partitioned, is partitioned into a certain partition shape (for example, partitioned into four coding units or partitioned into shapes corresponding to those into which the second coding unit 1210 is partitioned), or is partitioned only a certain number of times (for example, partitioned only n times wherein n>0). However, such limits on the third coding unit 1220*c* located at the center are only examples and should not be interpreted as being limited by those examples, but should be interpreted as including various limits as long as the third coding unit 1220*c* located at the center are decoded differently from the other third coding units 1220*b* and 1220*d*.

According to an embodiment, the image decoding apparatus 100 may obtain at least one of block shape information and partition shape information used to partition a current coding unit from a certain location in the current coding unit.

Figure 13:
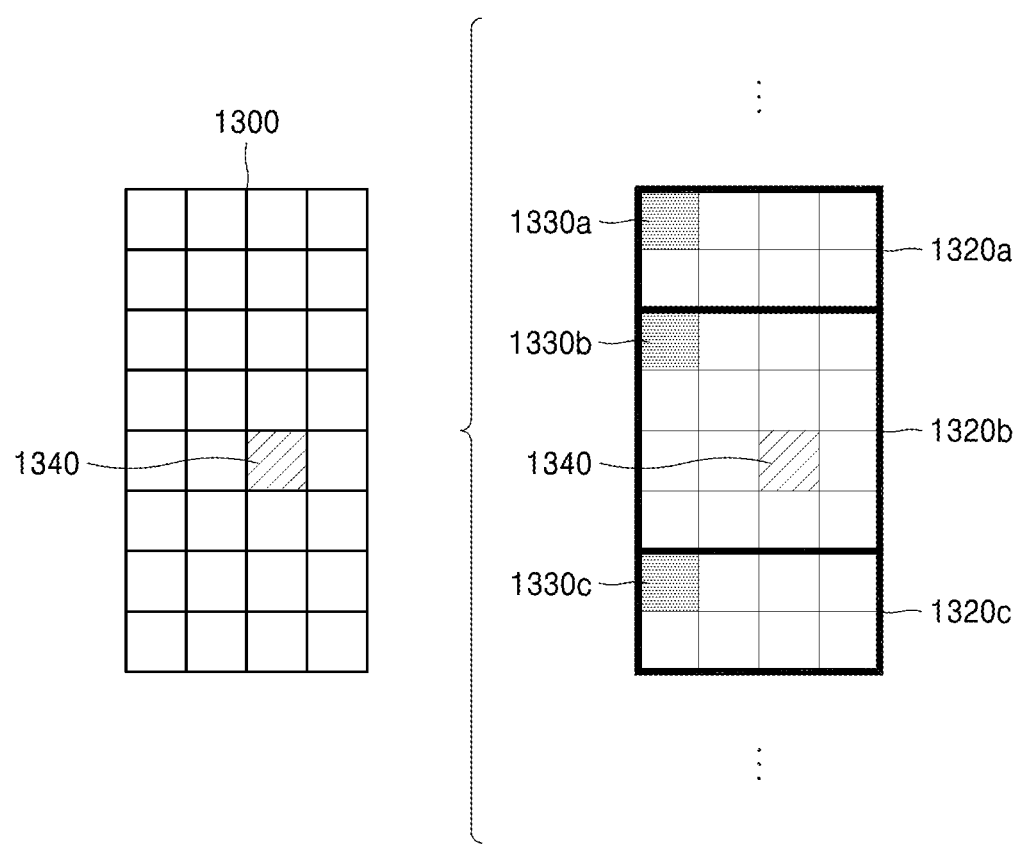
FIG. 13 illustrates a method of determining a certain coding unit from among an odd number of coding units, according to an embodiment.

FIG. 13 illustrates a method of determining, by the image decoding apparatus 100, a certain coding unit from among an odd number of coding units, according to an embodiment. Referring to FIG. 13, at least one of block shape information and partition shape information of a current coding unit 1300 may be obtained from a sample at a certain location (for example, a sample 1340 located at the center) from among a plurality of samples included in the current coding unit 1300. However, the certain location in the current coding unit 1300 from which at least one of block shape information and partition shape information is obtained is not limited to the center location shown in FIG. 13, but may be any location (for example, an uppermost location, a lowermost location, a left location, a right location, an upper left location, a lower left location, an upper right location, or a lower right location) included in the current coding unit 1300. The image decoding apparatus 100 may determine that a current coding unit is partitioned into coding units having various shapes and sizes or is not partitioned by obtaining at least one of block shape information and partition shape information from a certain location.

According to an embodiment, the image decoding apparatus 100 may select one coding unit when a current coding unit is partitioned into a certain number of coding units. A method of selecting one of a plurality of coding units may vary, and details thereof will be described below through various embodiments.

According to an embodiment, the image decoding apparatus 100 may partition a current coding unit into a plurality of coding units, and determine a coding unit at a certain location.

FIG. 13 illustrates a method of determining, by the image decoding apparatus 100, a coding unit at a certain location from among an odd number of coding units, according to an embodiment.

According to an embodiment, the image decoding apparatus 100 may use information indicating a location of each of the odd number of coding units so as to determine a coding unit located at the center from among the odd number of coding units. Referring to FIG. 13, the image decoding apparatus 100 may determine the odd number of coding units 1320*a* through 1320*c* by partitioning the current coding unit 1300. The image decoding apparatus 100 may determine the center coding unit 1320*b* by using information about the locations of the odd number of coding units 1320*a* through 1320*c*. For example, the image decoding apparatus 100 may determine the coding unit 1320*b* located at the center by determining the locations of the coding units 1320*a* through 1320*b* based on information indicating locations of certain samples included in the coding units 1320*a* through 1320*c*. In detail, the image decoding apparatus 100 may determine the coding unit 1320*b* located at the center by determining the locations of the coding units 1320*a* through 1320*c* based on information indicating locations of upper left samples 1330*a* through 1330*c* of the coding units 1320*a* through 1320*c*.

According to an embodiment, the information indicating the locations of the upper left samples 1330*a* through 1330*c* included in the coding units 1320*a* through 1320*c* respectively may include information about a location or coordinates of the coding units 1320*a* through 1320*c* in a picture. According to an embodiment, the information indicating the locations of the upper left samples 1330*a* through 1330*c* included in the coding units 1320*a* through 1320*c* respectively may include information indicating widths or heights of the coding units 1320*a* through 1320*c* included in the current coding unit 1300, and such widths or heights may correspond to information indicating differences between coordinates of the coding units 1320*a* through 1320*c* in a picture. In other words, the image decoding apparatus 100 may determine the coding unit 1320*b* located at the center by directly using the information about the locations or coordinates of the coding units 1320*a* through 1320*c* in a picture or by using information about the widths or heights of the coding units 1320*a* through 1320*c* corresponding to the differences between coordinates.

According to an embodiment, the information indicating the location of the upper left sample 1330*a* of the upper coding unit 1320*a* may indicate (xa, ya) coordinates, the information indicating the location of the upper left sample 1330*b* of the center coding unit 1320*b* may indicate (xb, yb) coordinates, and the information indicating the location of the upper left sample 1330*c* of the lower coding unit 1320*c* may indicate (xc, yc) coordinates. The image decoding apparatus 100 may determine the center coding unit 1320*b* by using the coordinates of the upper left samples 1330*a* through 1330*c* respectively included in the coding units 1320*a* through 1320*c*. For example, when the coordinates of the upper left samples 1330*a* through 1330*c* are arranged in an ascending order or descending order, the coding unit 1320*b* including the coordinates (xb, yb) of the sample 1330*b* located at the center may be determined as a coding unit located at the center from among the coding units 1320*a* through 1320*c* determined when the current coding unit 1300 is partitioned. However, coordinates indicating the locations of the upper left samples 1330*a* through 1330*c* may be coordinates indicating absolute locations in a picture, and in addition, (dxb, dyb) coordinates, i.e., information indicating a relative location of the upper left sample 1330*b* of the center coding unit 1320*b*, and (dxc, dyc) coordinates, i.e., information indicating a relative location of the upper left sample 1330*c* of the lower coding unit 1320*c*, may be used based on the location of the upper left sample 1330*a* of the upper coding unit 1320*a*. Also, a method of determining a coding unit at a certain location by using, as information indicating locations of samples included in coding units, coordinates of the samples is not limited to the above, and various arithmetic methods capable of using coordinates of samples may be used.

According to an embodiment, the image decoding apparatus 100 may partition the current coding unit 1300 into the plurality of coding units 1320*a* through 1320*c*, and select a coding unit from the coding units 1320*a* through 1320*c* according to a certain standard. For example, the image decoding apparatus 100 may select the coding unit 1320*b* having a different size from among the coding units 1320*a* through 1320*c*.

According to an embodiment, the image decoding apparatus 100 may determine widths or heights of the coding units 1320*a* through 1320*c* by respectively using the (xa, ya) coordinates, i.e., the information indicating the location of the upper left sample 1330*a* of the upper coding unit 1320*a*, the (xb, yb) coordinates, i.e., the information indicating the location of the upper left sample 1330*b* of the center coding unit 1320*b*, and the (xc, yc) coordinates, i.e., the information indicating the location of the upper left sample 1330*c* of the lower coding unit 1320*c*. The image decoding apparatus 100 may determine the sizes of the coding units 1320*a* through 1320*c* by respectively using the coordinates (xa, ya), (xb, yb), and (xc, yc) indicating the locations of the coding units 1320*a* through 1320*c*.

According to an embodiment, the image decoding apparatus 100 may determine the width of the upper coding unit 1320*a* to be xb-xa, and the height to be yb-ya. According to an embodiment, the image decoding apparatus 100 may determine the width of the center coding unit 1320*b* to be xc-xb, and the height to be yc-yb. According to an embodiment, the image decoding apparatus 100 may determine the width or height of the lower coding unit 1320*c* by using the width and height of the current coding unit 1300 and the widths and heights of the upper coding unit 1320*a* and center coding unit 1320*b*. The image decoding apparatus 100 may determine a coding unit having a different size from other coding units based on the determined widths and heights of the coding units 1320*a* through 1320*c*. Referring to FIG. 13, the image decoding apparatus 100 may determine the center coding unit 1320*b* having a size different from those of the upper coding unit 1320*a* and lower coding unit 1320*c* as a coding unit at a certain location. However, processes of the image decoding apparatus 100 determining a coding unit having a different size from other coding units are only an example of determining a coding unit at a certain location by using sizes of coding units determined based on sample coordinates, and thus various processes of determining a coding unit at a certain location by comparing sizes of coding units determined according to certain sample coordinates may be used.

However, a location of a sample considered to determine a location of a coding unit is not limited to the upper left as described above, and information about a location of an arbitrary sample included in a coding unit may be used.

According to an embodiment, the image decoding apparatus 100 may select a coding unit at a certain location from among an odd number of coding units determined when a current coding unit is partitioned, while considering a shape of the current coding unit. For example, when the current coding unit has a non-square shape in which a width is longer than a height, the image decoding apparatus 100 may determine a coding unit at a certain location in a horizontal direction. In other words, the image decoding apparatus 100 may determine one of coding units having a different location in the horizontal direction and set a limit on the one coding unit. When the current coding unit has a non-square shape in which a height is longer than a width, the image decoding apparatus 100 may determine a coding unit at a certain location in a vertical direction. In other words, the image decoding apparatus 100 may determine one of coding units having a different location in the vertical direction and set a limit on the one coding unit.

According to an embodiment, the image decoding apparatus 100 may use information indicating a location of each of an even number of coding units so as to determine a coding unit at a certain location from among the even number of coding units. The image decoding apparatus 100 may determine the even number of coding units by partitioning a current coding unit, and determine the coding unit at the certain location by using information about the locations of the even number of coding units. Detailed processes thereof may correspond to those of determining a coding unit at a certain location (for example, a center location) from among an odd number of coding units described in FIG. 13, and thus details thereof are not provided again.

According to an embodiment, when a current coding unit having a non-square shape is partitioned into a plurality of coding units, certain information about a coding unit at a certain location during partitioning processes may be used to determine the coding unit at the certain location from among the plurality of coding units. For example, the image decoding apparatus 100 may use at least one of block shape information and partition shape information stored in a sample included in a center coding unit during partitioning processes so as to determine a coding unit located at the center from among a plurality of coding units obtained by partitioning a current coding unit.

Referring to FIG. 13, the image decoding apparatus 100 may partition the current coding unit 1300 into the plurality of coding units 1320a through 1320c based on at least one of block shape information and partition shape information, and determine the coding unit 1320b located at the center from among the plurality of coding units 1320a through 1320c. In addition, the image decoding apparatus 100 may determine the coding unit 1320b located at the center considering a location from which at least one of the block shape information and the partition shape information is obtained. In other words, at least one of the block shape information and the partition shape information of the current coding unit 1300 may be obtained from the sample 1340 located at the center of the current coding unit 1300, and when the current coding unit 1300 is partitioned into the plurality of coding units 1320a through 1320c based on at least one of the block shape information and the partition shape information, the coding unit 1320b including the sample 1340 may be determined as a coding unit located at the center. However, information used to determine a coding unit located at the center is not limited to at least one of the block shape information and the partition shape information, and various types of information may be used while determining a coding unit located at the center.

According to an embodiment, certain information for identifying a coding unit at a certain location may be obtained from a certain sample included in a coding unit to be determined. Referring to FIG. 13, the image decoding apparatus 100 may use at least one of block shape information and partition shape information obtained from a sample at a certain location in the current coding unit 1300 (for example, a sample located at the center of the current coding unit 1300), so as to determine a coding unit at a certain location (for example, a coding unit located at the center from among a plurality of coding units) from among the plurality of coding units 1320a through 1320c determined when the current coding unit 1300 is partitioned. In other words, the image decoding apparatus 100 may determine the sample at the certain location considering a block shape of the current coding unit 1300, and determine and set a certain limit on the coding unit 1320b including a sample from which certain information (for example, at least one of block shape information and partition shape information) is obtainable, from among the plurality of coding units 1320a through 1320c determined when the current coding unit 1300 is partitioned. Referring to FIG. 13, according to an embodiment, the image decoding apparatus 100 may determine, as a sample from which certain information is obtainable, the sample 1340 located at the center of the current coding unit 1300, and set a certain limit on the coding unit 1320b including such a sample 1340 during decoding processes. However, a location of a sample from which certain information is obtainable is not limited to the above, and may be a sample at an arbitrary location included in the coding unit 1320b determined to set a limit.

According to an embodiment, a location of a sample from which certain information is obtainable may be determined according to a shape of the current coding unit 1300. According to an embodiment, block shape information may determine whether a shape of a current coding unit is square or non-square, and determine a location of a sample from which certain information is obtainable according to the shape. For example, the image decoding apparatus 100 may determine, as a sample from which certain information is obtainable, a sample located on a boundary of partitioning at least one of a width and a height of a current coding unit into halves by using at least one of information about the width of the current coding unit and information about the height of the current coding unit. As another example, when block shape information related to a current coding unit indicates a non-square shape, the image decoding apparatus 100 may determine, as a sample from which certain information is obtainable, one of samples adjacent to a boundary of partitioning long sides of the current coding unit into halves.

According to an embodiment, when a current coding unit is partitioned into a plurality of coding units, the image decoding apparatus 100 may use at least one of block shape information and partition shape information so as to determine a coding unit at a certain location from among the plurality of coding units. According to an embodiment, the image decoding apparatus 100 may obtain at least one of block shape information and partition shape information from a sample at a certain location included in a coding unit, and may partition a plurality of coding units generated as a current coding unit is partitioned by using at least one of the partition shape information and the block shape information obtained from the sample at the certain location included in each of the plurality of coding units. In other words, a coding unit may be recursively partitioned by using at least one of block shape information and partition shape information obtained from a sample at a certain location included in each coding unit. Since processes of recursively partitioning a coding unit have been described above with reference to FIG. 12, details thereof are not provided again.

According to an embodiment, the image decoding apparatus 100 may determine at least one coding unit by partitioning a current coding unit, and determine an order of decoding the at least one coding unit according to a certain block (for example, the current coding unit).

Figure 14:
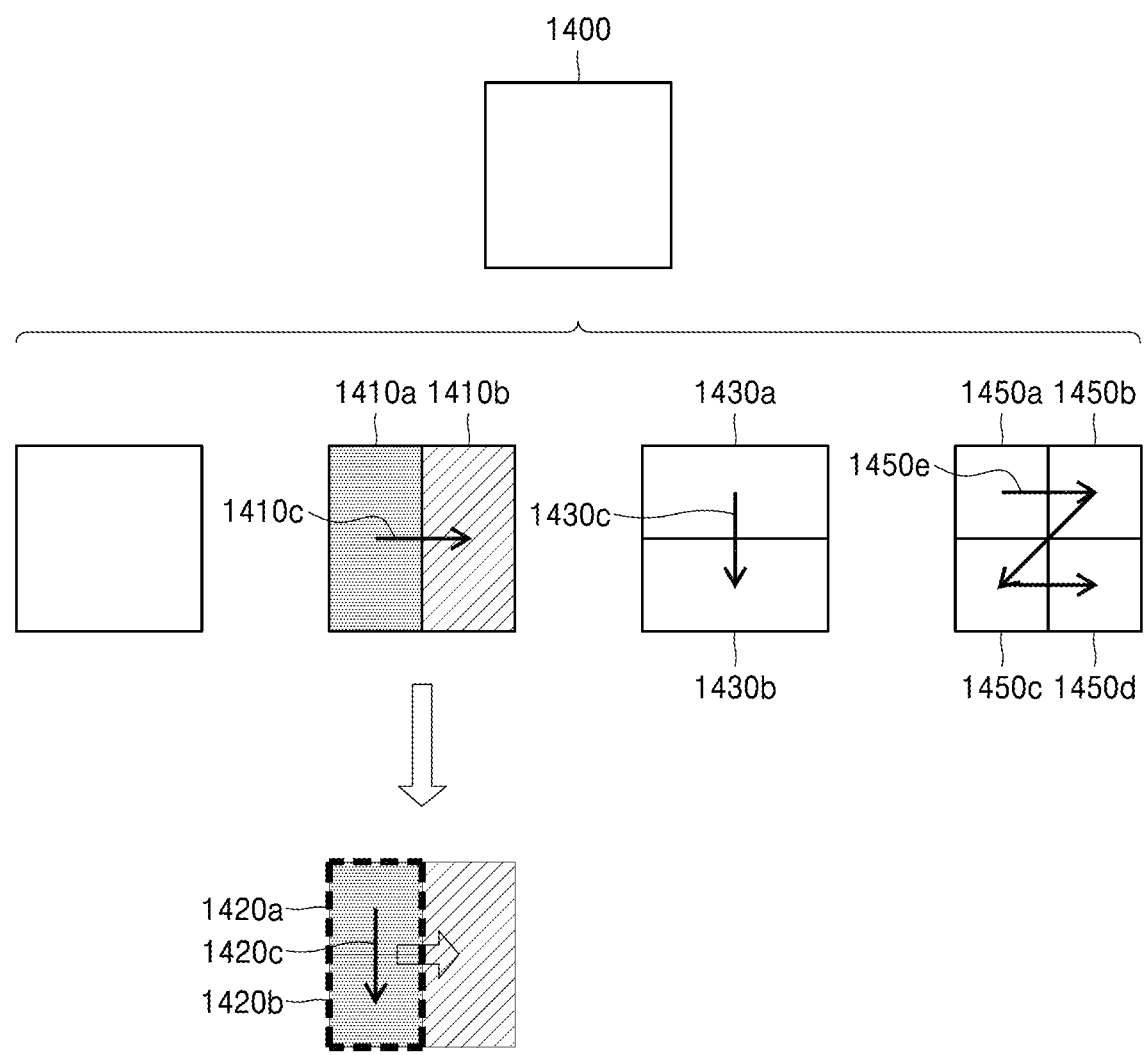
FIG. 14 illustrates an order of processing a plurality of coding units when the plurality of coding units are determined when a current coding unit is partitioned, according to an embodiment.

FIG. 14 illustrates an order of processing a plurality of coding units when the plurality of coding units are determined when the image decoding apparatus 100 partitions a current coding unit, according to an embodiment.

According to an embodiment, the image decoding apparatus 100 may determine second coding units 1410a and 1410b by partitioning a first coding unit 1400 in a vertical direction, determine second coding units 1430a and 1430b by partitioning the first coding unit 1400 in a horizontal direction, or determine second coding units 1450a through 1450d by partitioning the first coding unit 140 in horizontal and vertical directions, according to block shape information and partition shape information.

Referring to FIG. 14, the image decoding apparatus 100 may determine the second coding units 1410a and 1410b, which are determined by partitioning the first coding unit 1400 in the vertical direction, to be processed in a horizontal direction 1410c. The image decoding apparatus 100 may determine the second coding units 1430a and 1430b, which are determined by partitioning the first coding unit 1400 in the horizontal direction, to be processed in a vertical direction 1430c. The image decoding apparatus 100 may determine the second coding units 1450a through 1450d, which are determined by partitioning the first coding unit 1400 in the vertical and horizontal directions, to be processed according to a certain order in which coding units located in one row is processed and then coding units located in a next row is processed (for example, a raster scan order or a z-scan order 1450e).

According to an embodiment, the image decoding apparatus 100 may recursively partition coding units. Referring to FIG. 14, the image decoding apparatus 100 may determine the plurality of second coding units 1410a and 1410b, 1430a and 1430b, or 1450a through 1450d by partitioning the first coding unit 1400, and recursively partition each of the plurality of second coding units 1410a and 1410b, 1430a and 1430b, or 1450a through 1450d. A method of partitioning the plurality of second coding units 1410a and 1410b, 1430a and 1430b, or 1450a through 1450d may correspond to a method of partitioning the first coding unit 1400. Accordingly, each of the plurality of second coding units 1410a and 1410b, 1430a and 1430b, or 1450a through 1450d may be independently partitioned into a plurality of coding units. Referring to FIG. 14, the image decoding apparatus 100 may determine the second coding units 1410a and 1410b by partitioning the first coding unit 1400 in the vertical direction, and in addition, determine that each of the second coding units 1410a and 1410b is independently partitioned or not partitioned.

According to an embodiment, the image decoding apparatus 100 may partition the second coding unit 1410a at the left in a horizontal direction into third coding units 1420a and 1420b, and may not partition the second coding unit 1410b at the right.

According to an embodiment, an order of processing coding units may be determined based on partition processes of coding units. In other words, an order of processing coding units that are partitioned may be determined based on an order of processing coding units before being partitioned. The image decoding apparatus 100 may determine an order of processing the third coding units 1420a and 1420b determined when the second coding unit 1410a at the left is partitioned independently from the second coding unit 1410b at the right. Since the third coding units 1420a and 1420b are determined when the second coding unit 1410a at the left is partitioned in a horizontal direction, the third coding units 1420a and 1420b may be processed in a vertical direction 1420c. Also, since an order of processing the second coding unit 1410a at the left and the second coding unit 1410b at the right corresponds to the horizontal direction 1410c, the second coding unit 1410b at the right may be processed after the third coding units 1420a and 1420b included in the second coding unit 1410a at the left are processed in the vertical direction 1420c. The above descriptions are related processes of determining an order of processing coding units according to coding units before being partitioned, but such processes are not limited to the above embodiments, and any method of independently processing, in a certain order, coding units partitioned into various shapes may be used.

Figure 15:
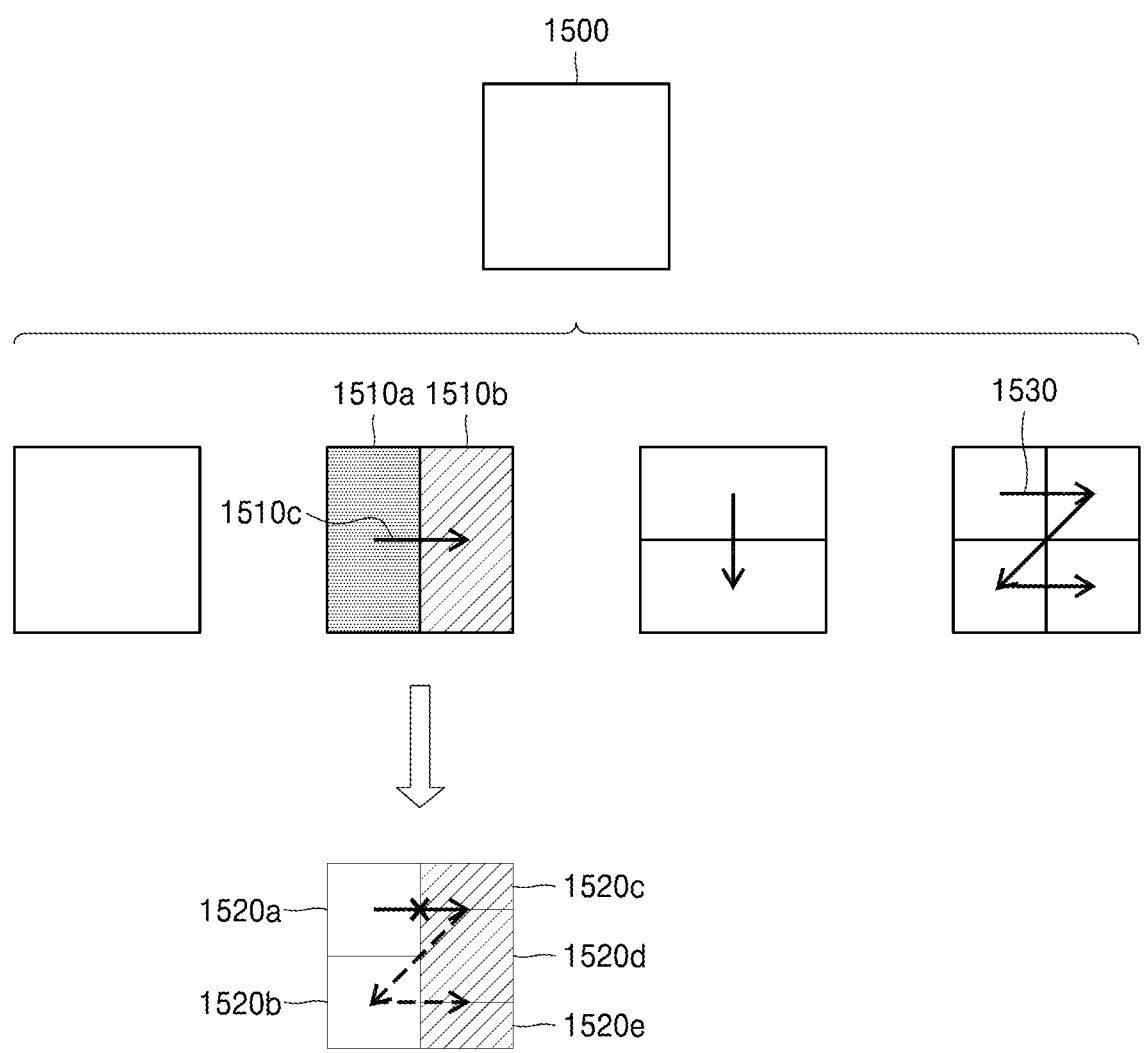
FIG. 15 illustrates processes of determining that a current coding unit is partitioned into an odd number of coding units when coding units are not processable in a certain order, according to an embodiment.

FIG. 15 illustrates processes of determining that a current coding unit is partitioned into an odd number of coding units when coding units are not processable in a certain order by the image decoding apparatus 100, according to an embodiment.

According to an embodiment, the image decoding apparatus 100 may determine that a current coding unit is partitioned into an odd number of coding units based on obtained block shape information and partition shape information. Referring to FIG. 15, a first coding unit 1500 having a square shape may be partitioned into second coding units 1510a and 1510b having a non-square shape, and the second coding units 1510a and 1510b may be independently respectively partitioned into third coding units 1520a and 1520b, and 1520c through 1520e. According to an embodiment, the image decoding apparatus 100 may partition the second coding unit 1510a at the left from among the second coding units 1510a and 1510b into a horizontal direction to determine the plurality of third coding units 1520a and 1520b, and partition the second coding unit 1510b at the right into the odd number of third coding units 1520c through 1520e.

According to an embodiment, the image decoding apparatus 100 may determine whether a coding unit partitioned into an odd number exists by determining whether the third coding units 1520a through 1520e are processable in a certain order. Referring to FIG. 15, the image decoding apparatus 100 may determine the third coding units 1520a through 1520e by recursively partitioning the first coding unit 1500. The video decoding apparatus 100 may determine whether any of the first coding unit 1500, the second coding units 1510a and 1510b, and the third coding units 1520a and 1520b, and 1520c to 1520e is partitioned into an odd number of coding units, based on at least one of the block shape information and the partition shape information. For example, the second coding unit 1510b at the right from among the second coding units 1510a and 1510b may be partitioned into the odd number of third coding units 1520c through 1520e. An order of processing a plurality of coding units included in the first coding unit 1500 may be a certain order (for example, a z-scan order 1530), and the image decoding apparatus 100 may determine whether the third coding units 1520c through 1520e determined when the second coding unit 1510b at the right is partitioned into an odd number satisfy a condition of being processable according to the certain order.

According to an embodiment, the image decoding apparatus 100 may determine whether the third coding units 1520a through 1520e included in the first coding unit 1500 satisfy a condition of being processable according to a certain order, wherein the condition is related to whether at least one of a width and a height of each of the second coding units 1510a and 1510b is partitioned into halves according to boundaries of the third coding units 1520a through 1520e. For example, the third coding units 1520a and 1520b determined when the height of the second coding unit 1510a at the left and having a non-square shape is partitioned into halves satisfy the condition, but it may be determined that the third coding units 1520c through 1520e do not satisfy the condition because the boundaries of the third coding units 1520c through 1520e that are determined when the second coding unit 1510b at the right is partitioned into three coding units do not partition the width or height of the second coding unit 1510b at the right into halves. The image decoding apparatus 100 may determine disconnection of a scan order when the condition is not satisfied, and determine that the second coding unit 1510b at the right is partitioned into the odd number of coding units, based on a result of the determination. According to an embodiment, the image decoding apparatus 100 may set a certain limit on a coding unit at a certain location from among an odd number of coding units obtained by partitioning a coding unit, and since such a limit or certain location has been described above through various embodiments, details thereof are not provided again.

Figure 16:
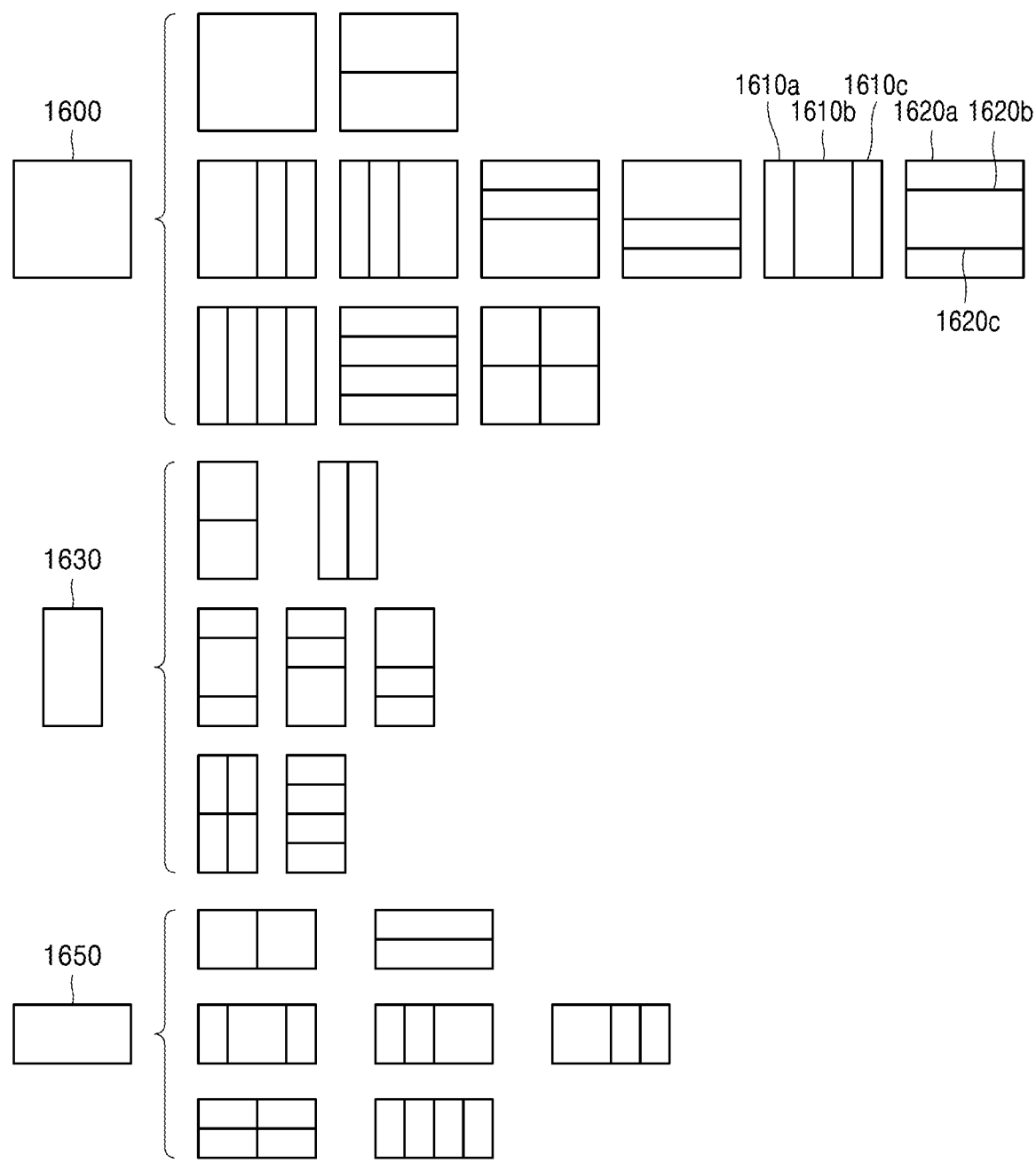
FIG. 16 illustrates processes of determining at least one coding unit when a first coding unit is partitioned, according to an embodiment.

FIG. 16 illustrates processes of determining at least one coding unit when the image decoding apparatus 100 partitions a first coding unit 1600, according to an embodiment. According to an embodiment, the image decoding apparatus 100 may partition the first coding unit 1600 based on at least one of block shape information and partition shape information obtained through the decoder 120. The first coding unit 1600 having a square shape may be partitioned into four coding units having a square shape or a plurality of coding units having a non-square shape. For example, referring to FIG. 16, when block shape information indicates that the first coding unit 1600 is a square and partition shape information indicates a partition into non-square coding units, the image decoding apparatus 100 may partition the first coding unit 1600 into a plurality of non-square coding units. In detail, when partition shape information indicates that an odd number of coding units are determined by partitioning the first coding unit 1600 in a horizontal direction or a vertical direction, the image decoding apparatus 100 may determine, as the odd number of coding units, second coding units 1610a through 1610c by partitioning the first coding unit 1600 having a square shape in a vertical direction, or second coding units 1620a through 1620c by partitioning the first coding unit 1600 in a horizontal direction.

According to an embodiment, the image decoding apparatus 100 may determine whether the second coding units 1610a through 1610c and 1620a through 1620c included in the first coding unit 1600 satisfy a condition of being processable in a certain order, wherein the condition is related to whether at least one of a width and a height of the first coding unit 1600 is partitioned into halves according to boundaries of the second coding units 1610a through 1610c and 1620a through 1620c. Referring to FIG. 16, since the boundaries of the second coding units 1610a through 1610c determined when the first coding unit 1600 having a square shape is partitioned in a vertical direction do not partition the width of the first coding unit 1600 into halves, it may be determined that the first coding unit 1600 does not satisfy the condition of being processable in a certain order. Also, since the boundaries of the second coding units 1620a through 1620c determined when the first coding unit 1600 having a square shape is partitioned in a horizontal direction do not partition the height of the first coding unit 1600 into halves, it may be determined that the first coding unit 1600 does not satisfy the condition of being processable in a certain order. The image decoding apparatus 100 may determine disconnection of a scan order when the condition is not satisfied, and determine that the first coding unit 1600 is partitioned into the odd number of coding units based on a result of the determination. According to an embodiment, the image decoding apparatus 100 may set a certain limit on a coding unit at a certain location from among an odd number of coding units obtained by partitioning a coding unit, and since such a limit or certain location has been described above through various embodiments, details thereof are not provided again.

According to an embodiment, the image decoding apparatus 100 may determine coding units having various shapes by partitioning a first coding unit.

Referring to FIG. 16, the image decoding apparatus 100 may partition the first coding unit 1600 having a square shape and a first coding unit 1630 or 1650 having a non-square shape into coding units having various shapes.

Figure 17:
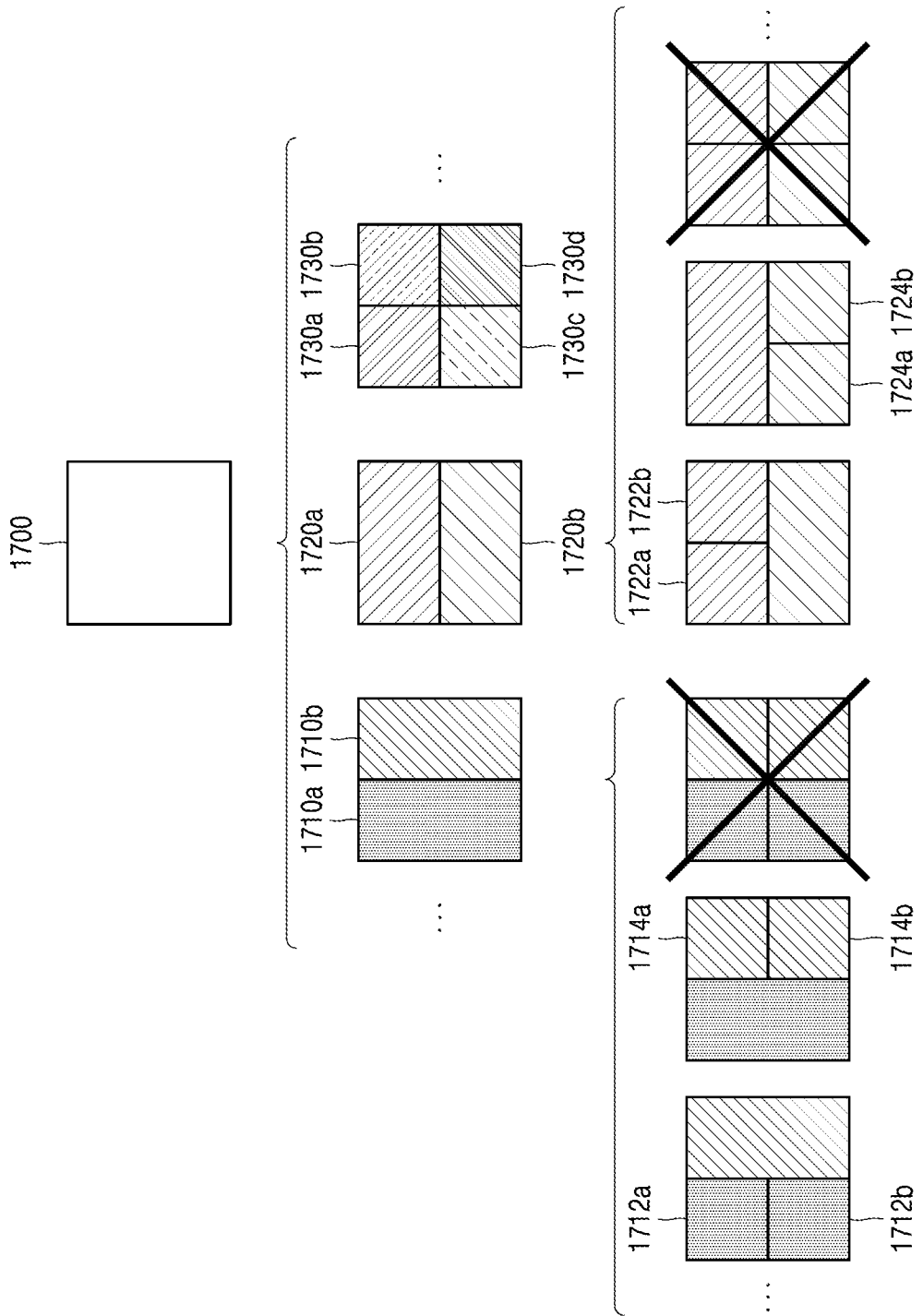
FIG. 17 illustrates that a shape into which a second coding unit is partitionable is restricted when the second coding unit having a non-square shape determined when a first coding unit is partitioned satisfies a certain condition, according to an embodiment.

FIG. 17 illustrates that a shape into which a second coding unit is partitionable by the image decoding apparatus 100 is restricted when the second coding unit having a non-square shape determined when a first coding unit 1700 is partitioned satisfies a certain condition, according to an embodiment.

According to an embodiment, the image decoding apparatus 100 may determine that the first coding unit 1700 having a square shape is partitioned into second coding units 1710a and 1710b or 1720a and 1720b having a non-square shape, based on at least one of block shape information and partition shape information obtained through the decoder 120. The second coding units 1710a and 1710b or 1720a and 1720b may be independently partitioned. Accordingly, the image decoding apparatus 100 may determine that the second coding units 1710a and 1710b or 1720a and 1720b are partitioned into a plurality of coding units or are not partitioned based on at least one of block shape information and partition shape information related to each of the coding units 1710a and 1710b or 1720a and 1720b. According to an embodiment, the image decoding apparatus 100 may determine third coding units 1712a and 1712b by partitioning, in a horizontal direction, the second coding unit 1710a at the left having a non-square shape, which is determined when the first coding unit 1700 is partitioned in a vertical direction. However, when the second coding unit 1710a at the left is partitioned in the horizontal direction, the image decoding apparatus 100 may set a limit that the second coding unit 1710b at the right is not partitioned in the horizontal direction like the second coding unit 1710a at the left. When third coding units 1714a and 1714b are determined when the second coding unit 1710b at the right is partitioned in the same direction, i.e., the horizontal direction, the third coding units 1712a, 1712b, 1714a, and 1714b are determined when the second coding units 1710a at the left and the second coding unit 1710b at the right are each independently partitioned in the horizontal direction. However, this is the same result as partitioning the first coding unit 1700 into four second coding units 1730a through 1730d having a square shape based on at least one of block shape information and partition shape information, and thus may be inefficient in terms of image decoding.

According to an embodiment, the image decoding apparatus 100 may determine third coding units 1722a and 1722b or 1724a, and 1724b by partitioning, in a vertical direction, the second coding unit 1720a or 1720b having a non-square shape determined when the first coding unit 1700 is partitioned in the horizontal direction. However, when one of second coding units (for example, the second coding unit 1720a at the top) is partitioned in a vertical direction, the image decoding apparatus 100 may set a limit that the other second coding unit (for example, the second coding unit 1720b at the bottom) is not partitioned in the vertical direction like the second coding unit 1720a at the top for the above described reasons.

Figure 18:
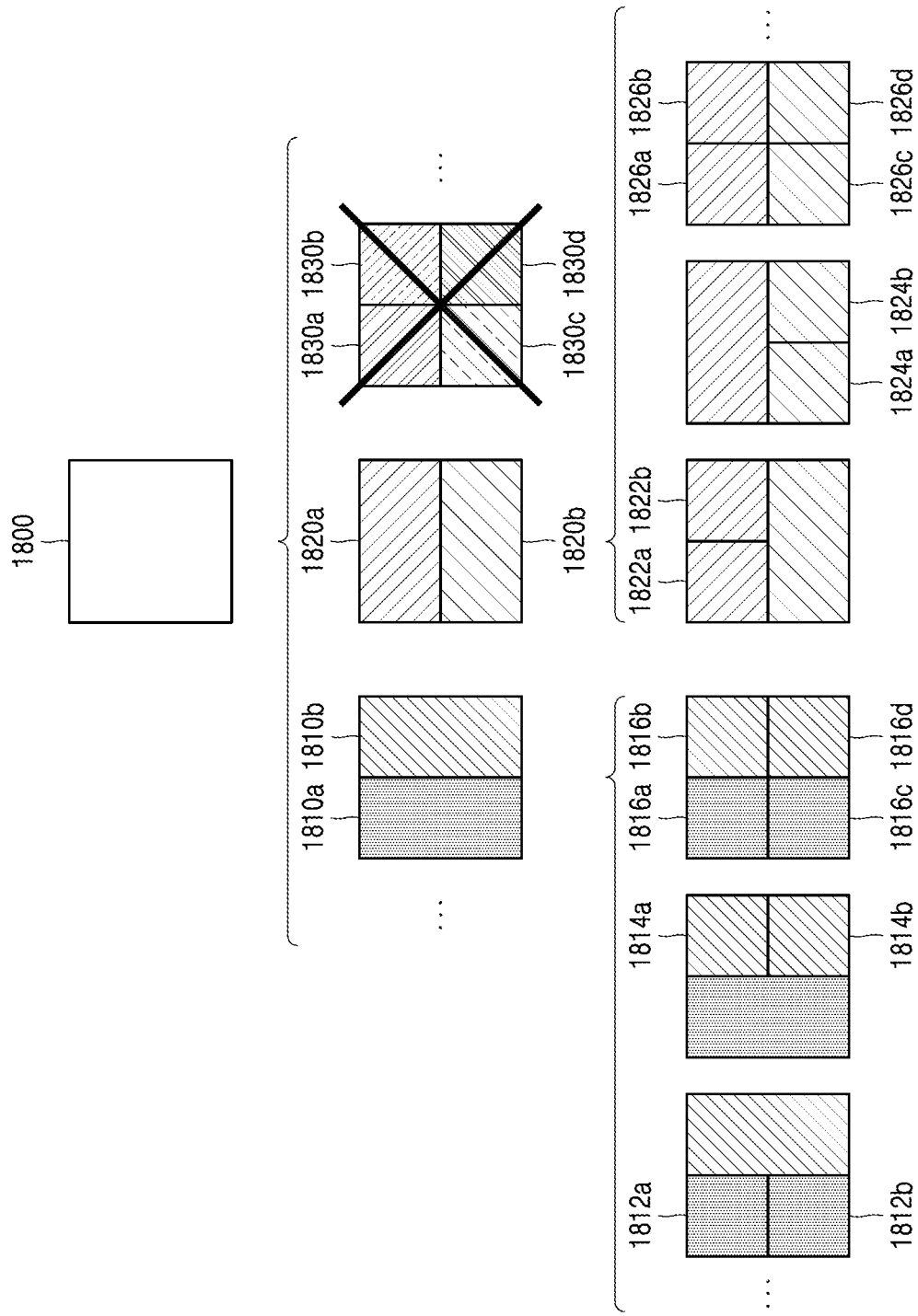
FIG. 18 illustrates processes of partitioning a coding unit having a square shape when partition shape information is unable to indicate that a coding unit is partitioned into four square shapes, according to an embodiment.

FIG. 18 illustrates processes of the image decoding apparatus 100 partitioning a coding unit having a square shape when partition shape information is unable to indicate that a coding unit is partitioned into four square shapes, according to an embodiment.

According to an embodiment, the image decoding apparatus 100 may determine second coding units 1810a and 1810b, or 1820a and 1820b, by partitioning a first coding unit 1800 based on at least one of block shape information and partition shape information. Partition shape information may include information about various shapes into which a coding unit may be partitioned, but such information about various shapes may not include information for partitioning a coding unit into four square coding units. According to such partition shape information, the image decoding apparatus 100 is unable to partitioned the first coding unit 1800 having a square shape into four second coding units 1830 through 1830d having a square shape. The image decoding apparatus 100 may determine the second coding units 1810a and 1810b, or 1820a and 1820b having a non-square shape based on the partition shape information.

According to an embodiment, the image decoding apparatus 100 may independently partition each of the second coding units 1810a and 1810b, or 1820a and 1820b having a non-square shape. Each of the second coding units 1810a and 1810b, or 1820a and 1820b may be partitioned in a certain order via a recursive method that may be a partitioning method corresponding to a method of partitioning the first coding unit 1800 based on at least one of the block shape information and the partition shape information.

For example, the image decoding apparatus 100 may determine third coding units 1812a and 1812b having a square shape by partitioning the second coding unit 1810a at the left in a horizontal direction, or determine third coding units 1814a and 1814b having a square shape by partitioning the second coding unit 1810b at the right in a horizontal direction. In addition, the image decoding apparatus 100 may determine third coding units 1816a through 1816d having a square shape by partitioning both the second coding unit 1810a at the left and the second coding unit 1810b at the right in the horizontal direction. In this case, coding units may be determined in the same manner as when the first coding unit 1800 is partitioned into four second coding units 1830a through 1830d having a square shape.

As another example, the image decoding apparatus 100 may determine third coding units 1822a and 1822b having a square shape by partitioning the second coding unit 1820a at the top in a vertical direction, and determine third coding units 1824a and 1824b having a square shape by partitioning the second coding unit 1820b at the bottom in a vertical direction. In addition, the image decoding apparatus 100 may determine third coding units 1826a through 1826d having a square shape by partitioning both the second coding unit 1820a at the top and the second coding unit 1820b at the bottom in the vertical direction. In this case, coding units may be determined in the same manner as when the first coding unit 1800 is partitioned into four second coding units 1830a through 1830d having a square shape.

Figure 19:
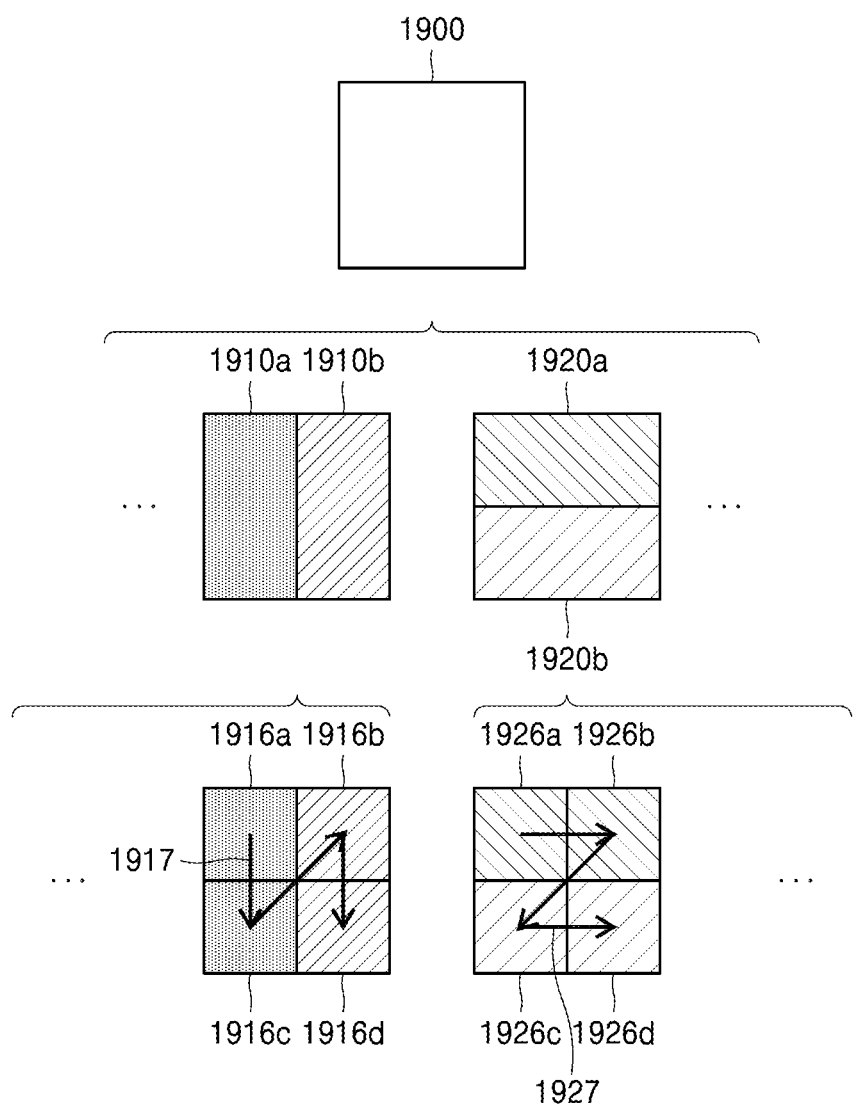
FIG. 19 illustrates that an order of processing a plurality of coding units may be changed according to processes of partitioning a coding unit, according to an embodiment.

FIG. 19 illustrates that an order of processing a plurality of coding units may be changed according to processes of partitioning a coding unit, according to an embodiment.

According to an embodiment, the image decoding apparatus 100 may partition a first coding unit 1900 based on block shape information and partition shape information. When the block shape information indicates a square shape and the partition shape information indicates that the first coding unit 1900 is partitioned in at least one of a horizontal direction and a vertical direction, the image decoding apparatus 100 may partition the first coding unit 1900 to determine second coding units 1910a and 1910b, or 1920a and 1920b. Referring to FIG. 19, the second coding units 1910a and 1910b, or 1920a and 1920b having a non-square shape and determined when the first coding unit 1900 is partitioned in the horizontal direction or the vertical direction may each be independently partitioned based on block shape information and partition shape information. For example, the image decoding apparatus 100 may determine third coding units 1916a through 1916d by partitioning, in the horizontal direction, each of the second coding units 1910a and 1910b generated as the first coding unit 1900 is partitioned in the vertical direction, or determine third coding units 1926a through 1926d by partitioning, in the horizontal direction, the second coding units 1920a and 1920b generated as the first coding unit 1900 is partitioned in the vertical direction. Processes of partitioning the second coding units 1910a and 1910b, or 1920a and 1920b have been described above with reference to FIG. 17, and thus details thereof are not provided again.

According to an embodiment, the image decoding apparatus 100 may process coding units according to a certain order. Features about processing coding units according to a certain order have been described above with reference to FIG. 14, and thus details thereof are not provided again. Referring to FIG. 19, the image decoding apparatus 100 may determine four third coding units 1916a through 1916d or 1926a through 1926d having a square shape by partitioning the first coding unit 1900 having a square shape. According to an embodiment, the image decoding apparatus 100 may determine an order of processing the third coding units 1916a through 1916d or 1926a through 1926d based on how the first coding unit 1900 is partitioned.

According to an embodiment, the image decoding apparatus 100 may determine the third coding units 1916a through 1916d by partitioning, in the horizontal direction, the second coding units 1910a and 1910b generated as the first coding unit 1900 is partitioned in the vertical direction, and process the third coding units 1916a through 1916d according to an order 1917 of first processing, in the vertical direction, the third coding units 1916a and 1916c included in the second coding unit 1910a at the left, and then processing, in the vertical direction, the third coding units 1916b and 1916d included in the second coding unit 1910b at the right.

According to an embodiment, the image decoding apparatus 100 may determine the third coding units 1926a through 1926d by partitioning, in the vertical direction, the second coding units 1920a and 1920b generated as the first coding unit 1900 is partitioned in the horizontal direction, and process the third coding units 1926a through 1926d according to an order 1927 of first processing, in the horizontal direction, the third coding units 1926a and 1926b included in the second coding unit 1920a at the top, and then processing, in the horizontal direction, the third coding units 1926c and 1926d included in the second coding unit 1920b at the bottom.

Referring to FIG. 19, the third coding units 1916a through 1916d or 1926a through 1926d having a square shape may be determined when the second coding units 1910a and 1910b, or 1920a and 1920b are each partitioned. The second coding units 1910a and 1910b determined when the first coding unit 1900 is partitioned in the vertical direction and the second coding units 1920a and 1920b determined when the first coding unit 1900 is partitioned in the horizontal direction are partitioned in different shapes, but according to the third coding units 1916a through 1916d and 1926a through 1926d determined afterwards, the first coding unit 1900 is partitioned in coding units having same shapes. Accordingly, the image decoding apparatus 100 may process pluralities of coding units determined in same shapes in different orders even when the coding units having the same shapes are consequently determined when coding units are recursively partitioned through different processes based on at least one of block shape information and partition shape information.

FIG. 20 illustrates processes of determining a depth of a coding unit as a shape and size of the coding unit are changed, when a plurality of coding units are determined when the coding unit is recursively partitioned, according to an embodiment.

According to an embodiment, the image decoding apparatus 100 may determine a depth of a coding unit according to a certain standard. For example, the certain standard may be a length of a long side of the coding unit. When a length of a long side of a current coding unit is partitioned $2^n$ times shorter than a length of a long side of a coding unit before being partitioned, it may be determined that a depth of the current coding unit is increased n times a depth of the coding unit before being partitioned, wherein n>0. Hereinafter, a coding unit having an increased depth is referred to as a coding unit of a lower depth.

Referring to FIG. 20, the image decoding apparatus 100 may determine a second coding unit 2002 and a third coding unit 2004 of lower depths by partitioning a first coding unit 2000 having a square shape, based on block shape information indicating a square shape (for example, block shape information may indicate '0: SQUARE'), according to an embodiment. When a size of the first coding unit 2000 having a square shape is 2N×2N, the second coding unit 2002 determined by partitioning a width and a height of the first coding unit 2000 by $½^1$ may have a size of N×N. In addition, the third coding unit 2004 determined by partitioning a width and a height of the second coding unit 2002 by ½ may have a size of N/2×N/2. In this case, a width and a height of the third coding unit 2004 corresponds to $½^2$ of the first coding unit 2000. When a depth of first coding unit 2000 is D, a depth of the second coding unit 2002 having $½^1$ of the width and the height of the first coding unit 2000 may be D+1, and a depth of the third coding unit 2004 having $½^2$ of the width and the height of the first coding unit 2000 may be D+2.

According to an embodiment, the image decoding apparatus 100 may determine a second coding unit 2012 or 2022 and a third coding unit 2014 or 2024 by partitioning a first coding unit 2010 or 2020 having a non-square shape, based on block shape information indicating a non-square shape (for example, block shape information may indicate '1: NS_VER' indicating a non-square shape in which a height is longer than a width, or '2: NS_HOR' indicating a non-square shape in which a width is longer than a height), according to an embodiment.

The image decoding apparatus 100 may determine a second coding unit (for example, the second coding unit 2002, 2012, or 2022) by partitioning at least one of a width and a height of the first coding unit 2010 having a size of N×2N. In other words, the image decoding apparatus 100 may determine the second coding unit 2002 having a size of N×N or the second coding unit 2022 having a size of N×N/2 by partitioning the first coding unit 2010 in a horizontal direction, or determine the second coding unit 2012 having a size of N/2×N by partitioning the first coding unit 2010 in horizontal and vertical directions.

The image decoding apparatus 100 may determine a second coding unit (for example, the second coding unit 2002, 2012, or 2022) by partitioning at least one of a width and a height of the first coding unit 2020 having a size of 2N×N. In other words, the image decoding apparatus 100 may determine the second coding unit 2002 having a size of N×N or the second coding unit 2012 having a size of N/2×N by partitioning the first coding unit 200 in a vertical direction, or determine the second coding unit 2022 having a size of N×N/2 by partitioning the first coding unit 2010 in horizontal and vertical directions.

According to an embodiment, the image decoding apparatus 100 may determine a third coding unit (for example, the third coding unit 2004, 2014, or 2024) by partitioning at least one of a width and a height of the second coding unit 2002 having a size of N×N. In other words, the image decoding apparatus 100 may determine the third coding unit 2004 having a size of N/2×N/2, the third coding unit 2014 having a size of N/$2^2$×N/2, or the third coding unit 2024 having a size of N/2×N/$2^2$ by partitioning the second coding unit 2002 in vertical and horizontal directions.

According to an embodiment, the image decoding apparatus 100 may determine a third coding unit (for example, the third coding unit 2004, 2014, or 2024) by partitioning at least one of a width and a height of the second coding unit 2022 having a size of N/2×N. In other words, the image decoding apparatus 100 may determine the third coding unit 2004 having a size of N/2×N/2 or the third coding unit 2024 having a size of N/2×N/$2^2$ by partitioning the second coding unit 2012 in a horizontal direction, or the third coding unit 2014 having a size of N/$2^2$×N/2 by partitioning the second coding unit 2012 in vertical and horizontal directions.

According to an embodiment, the image decoding apparatus 100 may determine a third coding unit (for example, the third coding unit 2004, 2014, or 2024) by partitioning at least one of a width and a height of the second coding unit 2022 having a size of N×N/2. In other words, the image decoding apparatus 100 may determine the third coding unit 2004 having a size of N/2×N/2 or the third coding unit 2014 having a size of N/$2^2$×N/2 by partitioning the second coding unit 2022 in a vertical direction, or the third coding unit 2024 having a size of N/2×N/2² by partitioning the second coding unit 2022 in vertical and horizontal directions.

According to an embodiment, the image decoding apparatus 100 may partition a coding unit (for example, the first, second, or third coding unit 2000, 2002, or 2004) having a square shape in a horizontal or vertical direction. For example, the first coding unit 2010 having a size of N×2N may be determined by partitioning the first coding unit 2000 having a size of 2N×2N in the vertical direction, or the first coding unit 2020 having a size of 2N×N may be determined by partitioning the first coding unit 2000 in the horizontal direction. According to an embodiment, when a depth is determined based on a length of a longest side of a coding unit, a depth of a coding unit determined when the first coding unit 2000 having a size of 2N×2N is partitioned in a horizontal or vertical direction may be the same as a depth of the first coding unit 2000.

According to an embodiment, the width and the height of the third coding unit 2014 or 2024 may be ½² of those of the first coding unit 2010 or 2020. When the depth of the first coding unit 2010 or 2020 is D, the depth of the second coding unit 2012 or 2022 that is ½ of the width and the height of the first coding unit 2010 or 2020 may be D+1, and the depth of the third coding unit 2014 or 2024 that is ½² of the width and the height of the first coding unit 2010 or 202 may be D+2.

Figure 21:
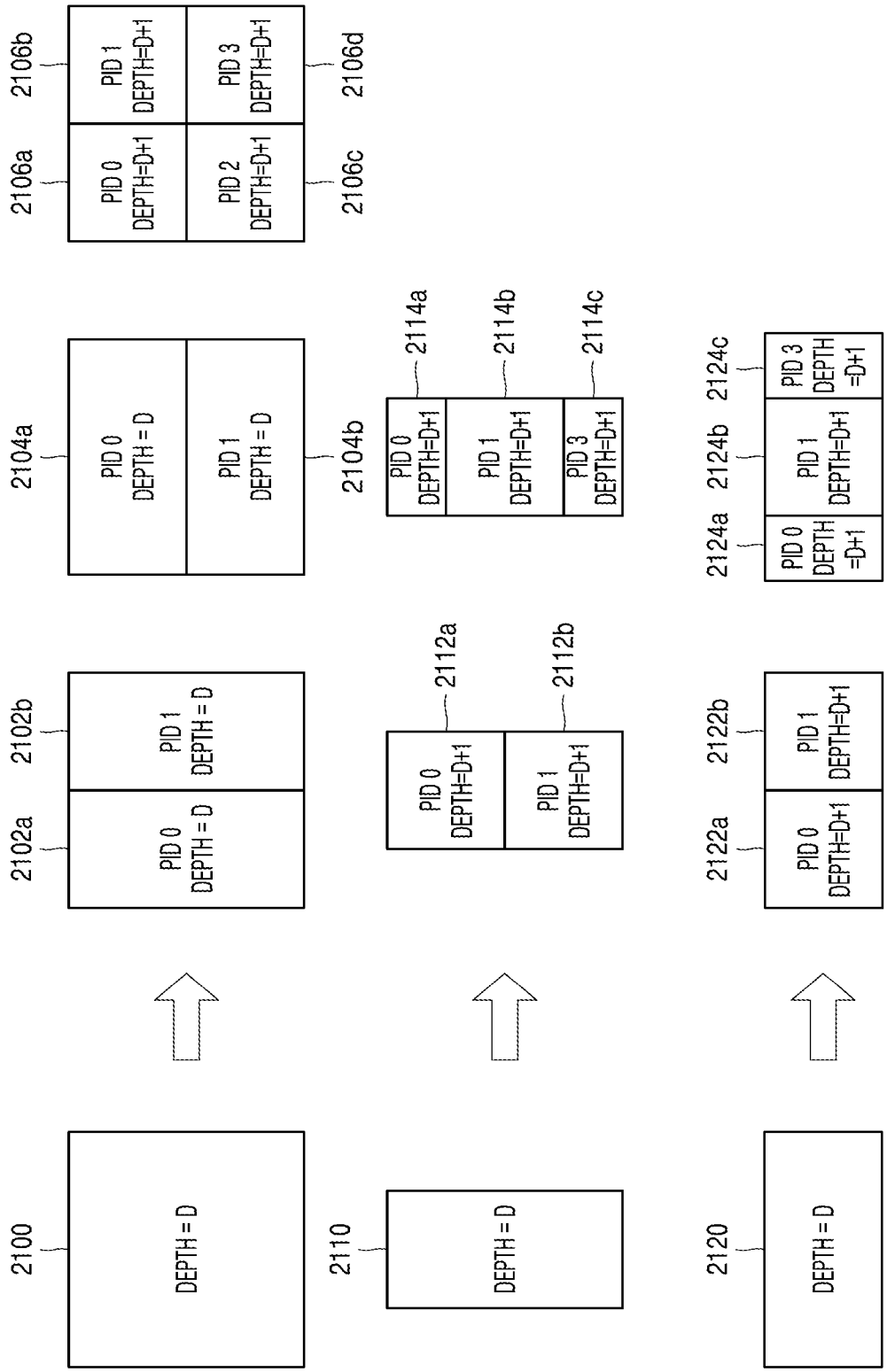
FIG. 21 illustrates a part index (PID) for distinguishing depths and coding units, which may be determined according to shapes and sizes of coding units, according to an embodiment.

FIG. 21 illustrates a part index (PID) for distinguishing depths and coding units, which may be determined according to shapes and sizes of coding units, according to an embodiment.

According to an embodiment, the image decoding apparatus 100 may determine a second coding unit having various shapes by partitioning a first coding unit 2100 having a square shape. Referring to FIG. 21, the image decoding apparatus 100 may determine second coding units 2102a and 2102b, 2104a and 2104b, or 2106a through 2106d by partitioning the first coding unit 2100 in at least one of a vertical direction and a horizontal direction, according to partition shape information. In other words, the image decoding apparatus 100 may determine the second coding units 2102a and 2102b, 2104a and 2104b, or 2106a through 2106d based on partition shape information of the first coding unit 2100.

According to an embodiment, a depth of the second coding units 2102a and 2102b, 2104a and 2104b, or 2106a through 2106d determined according to the partition shape information of the first coding unit 2100 having a square shape may be determined based on a length of a long side. For example, since a length of one side of the first coding unit 2100 having a square shape is the same as a length of a long side of the second coding units 2102a and 2102b or 2104a and 2104b having a non-square shape, the depths of the first coding unit 2100 and the second coding units 2102a and 2102b or 2104a and 2104b having a non-square shape may be the same, i.e., D. On the other hand, when the image decoding apparatus 100 partitions the first coding unit 2100 into the four second coding units 2106a through 2106d having a square shape, based on the partition shape information, a length of one side of the second coding units 2106a through 2106d having a square shape is ½ of the length of one side of the first coding unit 2100, the depths of the second coding units 2106a through 2106d may be D+1, i.e., a depth lower than the depth D of the first coding unit 2100.

According to an embodiment, the image decoding apparatus 100 may partition a first coding unit 2110, in which a height is longer than a width, in a horizontal direction into a plurality of second coding units 2112a and 2112b or 2114a through 2114c, according to partition shape information. According to an embodiment, the image decoding apparatus 100 may partition a first coding unit 2120, in which a width is longer than a height, in a vertical direction into a plurality of second coding units 2122a and 2122b or 2124a through 2124c, according to partition shape information.

According to an embodiment, depths of the second coding units 2112a and 2112b, 2114a through 2114c, 2122a and 2122b, or 2124a through 2124c determined according to the partition shape information of the first coding unit 2110 or 2120 having a non-square shape may be determined based on a length of a long side. For example, since a length of one side of the second coding units 2112a and 2112b having a square shape is ½ of a length of a long side of the first coding unit 2110 having a non-square shape, in which the height is longer than the width, the depths of the second coding units 2112a and 2112b are D+1, i.e., depths lower than the depth D of the first coding unit 2110 having a non-square shape.

In addition, the image decoding apparatus 100 may partition the first coding unit 2110 having a non-square shape into an odd number of second coding units 2114a through 2114c, based on partition shape information. The odd number of second coding units 2114a through 2114c may include the second coding units 2114a and 2114c having a non-square shape, and the second coding unit 2114b having a square shape. In this case, since a length of a long side of the second coding units 2114a and 2114c having a non-square shape and a length of one side of the second coding unit 2114b having a square shape are ½ of a length of one side of the first coding unit 2110, depths of the second coding units 2114a through 2114b may be D+1, i.e., a depth lower than the depth D of the first coding unit 2110. The image decoding apparatus 100 may determine depths of coding units related to the first coding unit 2120 having a non-square shape in which a width is longer than a height, in the same manner as the determining of depths of coding units related to the first coding unit 2110.

According to an embodiment, with respect to determining PIDs for distinguishing coding units, when an odd number of coding units do not have the same size, the image decoding apparatus 100 may determine PIDs based on a size ratio of the coding units. Referring to FIG. 21, the second coding unit 2114b located at the center from the odd number of second coding units 2114a through 2114c may have the same width as the second coding units 2114a and 2114c, but have a height twice higher than those of the second coding units 2114a and 2114c. In this case, the second coding unit 2114b located at the center may include two of the second coding units 2114a and 2114c. Accordingly, when the PID of the second coding unit 2114b located at the center is 1 according to a scan order, the PID of the second coding unit 2114c in a next order may be 3, the PID having increased by 2. In other words, values of the PID may be discontinuous. According to an embodiment, the image decoding apparatus 100 may determine whether an odd number of coding units have the same sizes based on discontinuity of PID for distinguishing the coding units.

According to an embodiment, the image decoding apparatus 100 may determine whether a plurality of coding units determined when a current coding unit is partitioned have certain partition shapes based on values of PID. Referring to FIG. 21, the image decoding apparatus 100 may determine the even number of second coding units 2112a and 211b or the odd number of second coding units 2114a through 2114c by partitioning the first coding unit 2110 having a rectangular shape in which the height is longer than the width. The image decoding apparatus 100 may use the PID indicating each coding unit so as to distinguish a plurality of coding units. According to an embodiment, a PID may be obtained from a sample at a certain location (for example, an upper left sample) of each coding unit.

According to an embodiment, the image decoding apparatus 100 may determine a coding unit at a certain location from among coding units determined by using PIDs for distinguishing coding units. According to an embodiment, when partition shape information of the first coding unit 2110 having a rectangular shape in which a height is longer than a width indicates that the first coding unit 2110 is partitioned into three coding units, the image decoding apparatus 100 may partition the first coding unit 2110 into the three second coding units 2114a through 2114c. The image decoding apparatus 100 may assign a PID to each of the three second coding units 2114a through 2114c. The image decoding apparatus 100 may compare PIDs of an odd number of coding units so as to determine a center coding unit from among the coding units. The image decoding apparatus 100 may determine, as a coding unit at a center location from among coding units determined when the first coding unit 2110 is partitioned, the second coding unit 2114b having a PID corresponding to a center value from among PIDs, based on PIDs of the coding units. According to an embodiment, while determining PIDs for distinguishing coding units, when the coding units do not have the same sizes, the image decoding apparatus 100 may determine PIDs based on a size ratio of the coding units. Referring to FIG. 21, the second coding unit 2114b generated when the first coding unit 2110 is partitioned may have the same width as the second coding units 2114a and 2114c, but may have a height twice higher than those of the second coding units 2114a and 2114c. In this case, when the PID of the second coding unit 2114b located at the center is 1, the PID of the second coding unit 2114c in a next order may be 3, the PID having increased by 2. As such, when an increasing range of PIDs differs while uniformly increasing, the image decoding apparatus 100 may determine that a current coding unit is partitioned into a plurality of coding units including a coding unit having a different size from other coding units. According to an embodiment, when partition shape information indicates partitioning into an odd number of coding units, the image decoding apparatus 100 may partition a current coding unit into a plurality of coding units, in which a coding unit at a certain location (for example, a center coding unit) has a size different from other coding units. In this case, the image decoding apparatus 100 may determine the center coding unit having the different size by using PIDs of the coding units. However, a PID, and a size or location of a coding unit at a certain location described above are specified to describe an embodiment, and thus should not be limitedly interpreted, and various PIDs, and various locations and sizes of a coding unit may be used.

According to an embodiment, the image decoding apparatus 100 may use a certain data unit from which recursive partitioning of a coding unit is started.

Figure 22:
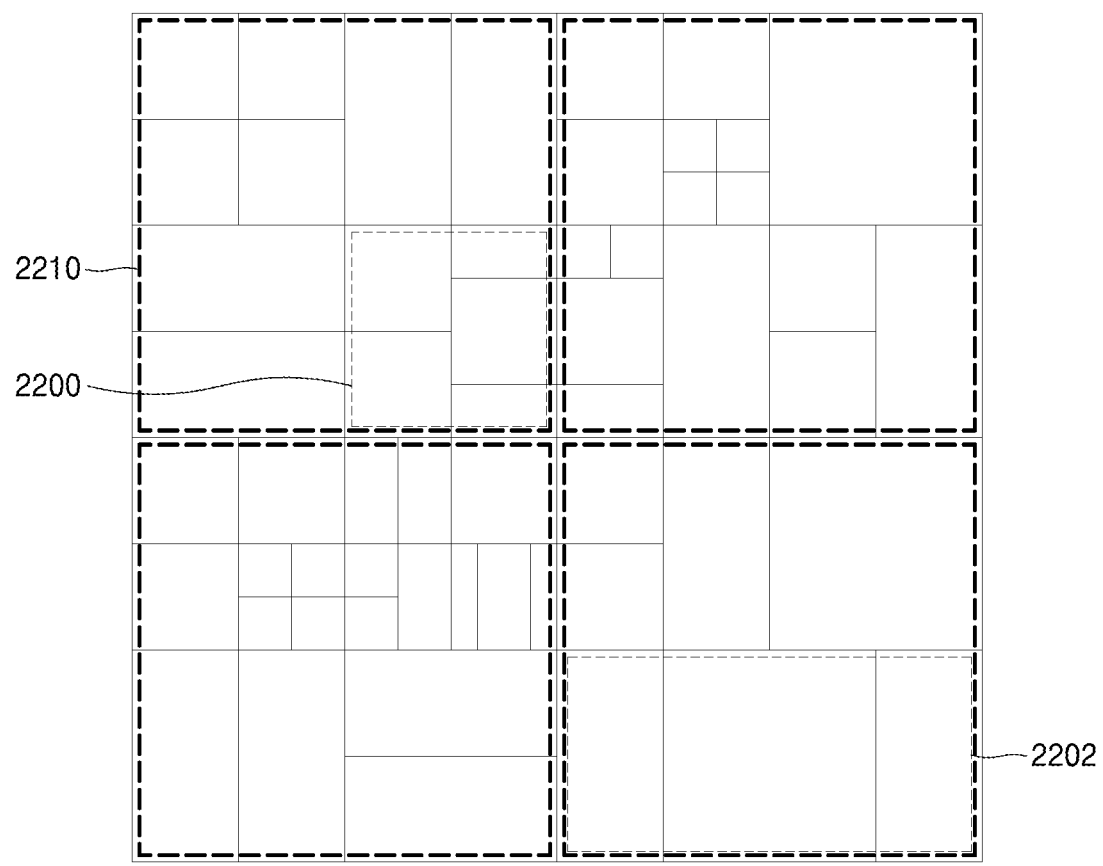
FIG. 22 illustrates that a plurality of coding units are determined according to a plurality of certain data units included in a picture, according to an embodiment.

FIG. 22 illustrates that a plurality of coding units are determined according to a plurality of certain data units included in a picture, according to an embodiment.

According to an embodiment, a certain data unit may be defined as a data unit from which a coding unit starts to be recursively partitioned by using at least one of block shape information and partition shape information. In other words, the certain data unit may correspond to a coding unit of an uppermost depth used while determining a plurality of coding units by partitioning a current picture. Hereinafter, the certain data unit is referred to as a reference data unit for convenience of description.

According to an embodiment, the reference data unit may indicate a certain size and shape. According to an embodiment, reference coding unit may include M×N samples. Here, M and N may be the same, and may be an integer expressed as a multiple of 2. In other words, a reference data unit may indicate a square shape or a non-square shape, and may later be partitioned into an integer number of coding units.

According to an embodiment, the image decoding apparatus 100 may partition a current picture into a plurality of reference data units. According to an embodiment, the image decoding apparatus 100 may partition the plurality of reference data units obtained by partitioning the current picture by using partition shape information about each of the reference data units. Partition processes of such reference data units may correspond to partition processes using a quad-tree structure.

According to an embodiment, the image decoding apparatus 100 may pre-determine a smallest size available for the reference data unit included in the current picture. Accordingly, the image decoding apparatus 100 may determine the reference data unit having various sizes that are equal to or larger than the smallest size, and determine at least one coding unit based on the determined reference data unit by using block shape information and partition shape information.

Referring to FIG. 22, the image decoding apparatus 100 may use a reference coding unit 2200 having a square shape, or may use a reference coding unit 2202 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the decoder 210 of the image decoding apparatus 100 may obtain, from a bitstream, at least one of information about a shape of a reference coding unit and information about a size of the reference coding unit, according to the various data units. Processes of determining at least one coding unit included in the reference coding unit 2200 having a square shape have been described above through processes of partitioning the current coding unit 1000 of FIG. 10, and processes of determining at least one coding unit included in the reference coding unit 2202 having a non-square shape have been described above through processes of partitioning the current coding unit 1100 or 1150 of FIG. 11, and thus details thereof are not provided again.

According to an embodiment, in order to determine a size and shape of a reference coding unit according to some data units pre-determined based on a predetermined condition, the image decoding apparatus 100 may use a PID for distinguishing the size and shape of the reference coding unit. In other words, the decoder 120 may obtain, from a bitstream, only a PID for distinguishing a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The image decoding apparatus 100 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. In other words, the image decoding apparatus 100 may select at least one of the pre-determined size and shape of the reference coding unit according to the PID so as to determine at least one of the size and shape of the reference coding unit included in a data unit that is a criterion for obtaining the PID.

According to an embodiment, the image decoding apparatus 100 may use at least one reference coding unit included in one largest coding unit. In other words, a largest coding unit partitioning an image may include at least one reference coding unit, and a coding unit may be determined when each of the reference coding unit is recursively partitioned. According to an embodiment, at least one of a width and height of the largest coding unit may be an integer times at least one of a width and height of the reference coding unit. According to an embodiment, a size of a reference coding unit may be equal to a size of a largest coding unit, which is partitioned n times according to a quad-tree structure. In other words, the image decoding apparatus 100 may determine a reference coding unit by partitioning a largest coding unit n times according to a quad-tree structure, and partition the reference coding unit based on at least one of block shape information and partition shape information according to various embodiments.

Figure 23:
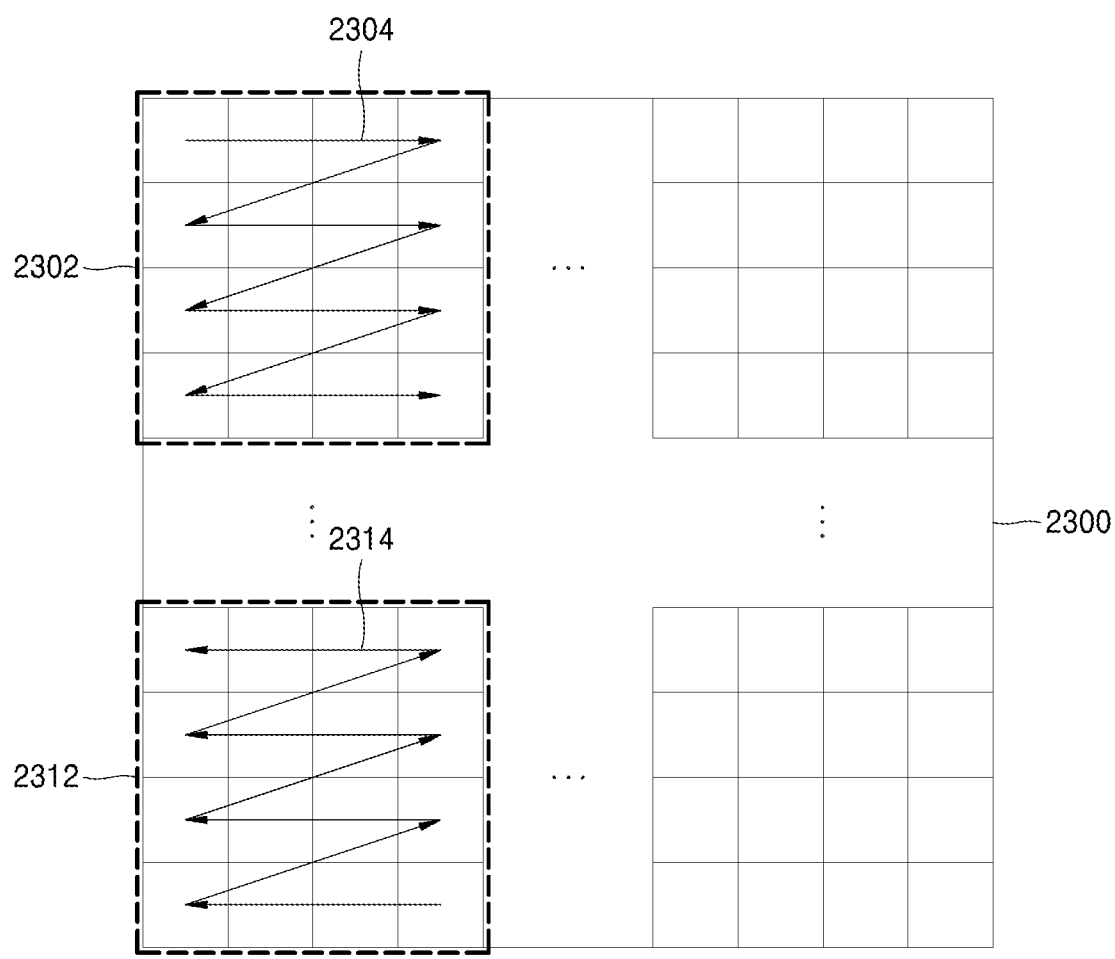
FIG. 23 illustrates a processing block serving as a criterion of determining a determination order of reference coding units included in a picture, according to an embodiment.

FIG. 23 illustrates a processing block serving as a criterion of determining a determination order of reference coding units included in a picture 2300, according to an embodiment.

According to an embodiment, the image decoding apparatus 100 may determine at least one processing block partitioning a picture. A processing block is a data unit including at least one reference coding unit partitioning an image, and the at least one reference coding unit included in the processing block may be determined in a certain order. In other words, a determining order of the at least one reference coding unit determined in each processing block may correspond to one of various orders for determining a reference coding unit, and may vary according to processing blocks. A determining order of reference coding units determined per processing block may be one of various orders, such as a raster scan order, a Z-scan order, an N-scan order, an up-right diagonal scan order, a horizontal scan order, and a vertical scan order, but should not be limitedly interpreted with respect to the scan orders.

According to an embodiment, the image decoding apparatus 100 may determine a size of at least one processing block included in an image by obtaining information about a size of a processing block. The image decoding apparatus 100 may obtain, from a bitstream, the information about a size of a processing block to determine the size of the at least one processing block included in the image. The size of the processing block may be a certain size of a data unit indicated by the information about a size of a processing block.

According to an embodiment, the decoder 120 of the image decoding apparatus 100 may obtain, from the bitstream, the information about a size of a processing block according to certain data units. For example, the information about a size of a processing block may be obtained from the bitstream in data units of images, sequences, pictures, slices, and slice segments. In other words, the decoder 120 may obtain, from the bitstream, the information about a size of a processing block according to such several data units, and the image decoding apparatus 100 may determine the size of at least one processing block partitioning the picture by using the obtained information about a size of a processing block, wherein the size of the processing block may be an integer times a size of a reference coding unit.

According to an embodiment, the image decoding apparatus 100 may determine sizes of processing blocks 2302 and 2312 included in the picture 2300. For example, the image decoding apparatus 100 may determine a size of a processing block based on information about a size of a processing block, the information being obtained from a bitstream. Referring to FIG. 23, the image decoding apparatus 100 may determine horizontal sizes of the processing blocks 2302 and 2312 to be four times a horizontal size of a reference coding unit, and a vertical size thereof to be four times a vertical size of the reference coding unit, according to an embodiment. The image decoding apparatus 100 may determine a determining order of at least one reference coding unit in at least one processing block.

According to an embodiment, the image decoding apparatus 100 may determine each of the processing blocks 2302 and 2312 included in the picture 2300 based on a size of a processing block, and determine a determining order of at least one reference coding unit included in each of the processing blocks 2302 and 2312. According to an embodiment, determining of a reference coding unit may include determining a size of the reference coding unit.

According to an embodiment, the image decoding apparatus 100 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. In other words, an order of determining reference coding units may be independently determined per processing block.

According to an embodiment, the image decoding apparatus 100 may obtain, from a bitstream, information about a determining order of a reference coding unit according to certain data units. For example, the decoder 120 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to an embodiment, the image decoding apparatus 100 may determine at least one reference coding unit based on the determined order.

According to an embodiment, the receiver 210 may obtain, from the bitstream, information about a determining order of a reference coding unit, as information related to the processing blocks 2302 and 2312, and the image decoding apparatus 100 may determine an order of determining at least one reference coding unit included in the processing blocks 2302 and 2312 and determine at least one reference coding unit included in the picture 2300 according to a determining order of a coding unit. Referring to FIG. 23, the image decoding apparatus 100 may determine determining orders 2304 and 2314 of at least one reference coding unit respectively related to the processing blocks 2302 and 2312. For example, when information about a determining order of a reference coding unit is obtained per processing block, determining orders of a reference coding unit related to the processing blocks 2302 and 2312 may be different from each other. When the determining order 2304 related to the processing block 2302 is a raster scan order, reference coding units included in the processing block 2302 may be determined according to the raster scan order. On the other hand, when the determining order 2314 related to the processing block 2312 is an inverse order of a raster scan order, reference coding units included in the processing block 2312 may be determined in the inverse order of the raster scan order.

The image decoding apparatus 100 may decode determined at least one reference coding unit, according to an embodiment. The image decoding apparatus 100 may decode an image based on reference coding units determined through above embodiments. Examples of a method of decoding a reference coding unit may include various methods of decoding an image.

According to an embodiment, the image decoding apparatus 100 may obtain, from a bitstream, and use block shape information indicating a shape of a current coding unit or partition shape information indicating a method of partitioning the current coding unit. The block shape information or the partition shape information may be included in a bitstream related to various data units. For example, the image decoding apparatus 100 may use the block shape information or partition shape information, which is included in a sequence parameter set, a picture parameter set, a video parameter set, a slice header, and a slice segment header. In addition, the image decoding apparatus 100 may obtain, from a bitstream, and use syntax corresponding to the block shape information or the partition shape information, according to largest coding units, reference coding units, and processing blocks.

While this disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

The invention claimed is:

1. An image decoding method comprising:
   determining a first motion vector related to a current prediction block;
   determining a first reference block included in a first reference picture, based on the first motion vector;
   determining a second reference block included in a second reference picture, based on a location of the first reference block;
   determining a first weight and a second weight by using a neighboring sample value of the first reference block and a neighboring sample value of the second reference block,
   determining a third reference block by applying the first weight and the second weight respectively to the first reference block and the second reference block; and
   decoding the current picture by performing inter prediction on the current prediction block by using at least one of the first reference block, the second reference block, and the third reference block,
   wherein the second reference picture comprises a prediction value of the first reference picture.

2. The image decoding method of claim 1, wherein the second reference picture comprises a sample obtained by performing motion estimation and motion compensation during an encoding process of the first reference picture.

3. The image decoding method of claim 1, wherein the decoding of the current picture comprises:
   determining at least one reference block used to perform the inter prediction, based on reference block information obtained from a bitstream; and
   performing the inter prediction by using the at least one reference block,
   wherein the reference block information indicates whether the second reference blocks is used to perform the inter prediction on the current prediction block.

4. The image decoding method of claim 3, wherein the determining of the at least one reference block comprises, when the reference block information indicates that the inter prediction is performed via a prediction method using the second reference block, determining at least one reference block comprising the second reference block used to perform the inter prediction, based on a pre-determined condition.

5. The image decoding method of claim 4, wherein the determining of the at least one reference block based on the pre-determined condition comprises determining whether only the second reference block is used or both the first and second reference blocks are used to perform the inter prediction, based on at least one of a first condition of a difference between the first reference picture and the second reference picture being smaller than a first threshold value and a second condition of a difference between a size of the first motion vector being smaller than a second threshold value.

6. The image decoding method of claim 1, wherein the first weight and the second weight are determined by using at least one sample adjacent to a left boundary of the first reference block and at least one sample adjacent to a left boundary of the second reference block.

7. The image decoding method of claim 1, wherein the first reference picture and the second reference picture are stored in different buffers.

8. The image decoding method of claim 1, wherein the first reference picture and the second reference picture are stored in a same buffer.

9. The image decoding method of claim 1, further comprising:
   determining a second motion vector related to the current prediction block;
   determining a fourth reference block included in a fourth reference picture, based on the second motion vector; and
   determining a fifth reference block included in a fifth reference picture, based on the fourth reference block, wherein the fifth reference picture comprises a prediction value of the fourth reference picture.

10. The image decoding method of claim 9, wherein the decoding of the current picture comprises performing bi-directional inter prediction on the current prediction block by using at least one of the first and second reference blocks and at least one of the fourth and fifth reference blocks.

11. An image encoding method comprising:
    determining a first motion vector related to a current prediction block;
    determining a first reference block included in a first reference picture, based on the first motion vector;
    determining a second reference block included in a second reference picture, based on a location of the first reference block;
    determining a first weight and a second weight by using a neighboring sample value of the first reference block and a neighboring sample value of the second reference block;
    determining a third reference block by applying the first weight and the second weight respectively to the first reference block and the second reference block; and
    encoding the current picture by performing inter prediction on the current prediction block by using at least one of the first reference block, the second reference block, and the third reference block,
    wherein the second reference picture comprises a prediction value of the first reference picture.

12. An image decoding apparatus comprising:
    a decoder configured to determine a first motion vector related to a current prediction block; and
    a reference block determiner configured to determine a first reference block included in a first reference picture, based on the first motion vector, determine a second reference block included in a second reference picture, based on a location of the first reference block, determine a first weight and a second weight by using a neighboring sample value of the first reference block and a neighboring sample value of the second reference block, and determine a third reference block by applying the first weight and the second weight respectively to the first reference block and the second reference block,
    wherein the decoder is further configured to decode the current picture by performing inter prediction on the current prediction block by using at least one of the first reference block, the second reference block, and the third reference block, and
    wherein the second reference picture comprises a prediction value of the first reference picture.

* * * * *